US010939288B2

(12) United States Patent
Vanderveen et al.

(10) Patent No.: US 10,939,288 B2
(45) Date of Patent: Mar. 2, 2021

(54) CELLULAR UNICAST LINK ESTABLISHMENT FOR VEHICLE-TO-VEHICLE (V2V) COMMUNICATION

(71) Applicant: QUALCOMM Incorporated, San Diego, CA (US)

(72) Inventors: Michaela Vanderveen, Tracy, CA (US); Hong Cheng, Bridgewater, NJ (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/204,665

(22) Filed: Nov. 29, 2018

(65) Prior Publication Data
US 2019/0223008 A1    Jul. 18, 2019

Related U.S. Application Data

(60) Provisional application No. 62/617,281, filed on Jan. 14, 2018.

(51) Int. Cl.
*H04W 12/00*    (2009.01)
*B64C 39/02*    (2006.01)
(Continued)

(52) U.S. Cl.
CPC ......... *H04W 12/003* (2019.01); *B64C 39/024* (2013.01); *H01Q 1/28* (2013.01);
(Continued)

(58) Field of Classification Search
CPC .. H04L 9/3268; H04L 63/0823; H04W 12/06; H04W 84/005; H04W 4/46;
(Continued)

(56) References Cited

U.S. PATENT DOCUMENTS

2012/0258664 A1* 10/2012 Kinneberg ............ H04W 8/005
455/41.2
2016/0277927 A1* 9/2016 Lee ........................ H04L 67/16
(Continued)

OTHER PUBLICATIONS

3GPP: 3rd Generation Partnership Project; Technical Specification Group Services and System Aspects; Study on Security Aspects for LTE Support of Vehicle-to-Everything (V2X) Services (Release 14), Sep. 1, 2017, pp. 1-75, XP055548405, Retrieved from the Internet: URL: http://www.3gpp.org/ftp/TSG_SA/WG3_Security/TSGS3_88_Dali/SA_77/33885-e10.doc [retrieved on Jan. 28, 2019].
(Continued)

*Primary Examiner* — Fred A Casca
(74) *Attorney, Agent, or Firm* — Loza & Loza, LLP

(57) ABSTRACT

Aspects of the disclosure relate to a system, method, and device for establishing a secure link for wireless communication. A device may send a service announcement message to at least one other device via sidelink signaling. The service announcement message indicates a capability of the device to perform a service and includes at least a security certificate of the device. The device establishes a secure link with the at least one other device corresponding to the service by establishing a device key between the device and the at least one other device. The device then communicates service data for the service between the device and the at least one other device via the secure link based on the established device key. Other aspects, embodiments, and features are also claimed and described.

64 Claims, 13 Drawing Sheets

(51) Int. Cl.
| | |
|---|---|
| *H04W 16/28* | (2009.01) |
| *H04B 7/0417* | (2017.01) |
| *H04B 7/06* | (2006.01) |
| *H04W 4/06* | (2009.01) |
| *H04W 12/04* | (2021.01) |
| *H04W 92/18* | (2009.01) |
| *H04L 29/06* | (2006.01) |
| *H04L 9/08* | (2006.01) |
| *H04W 12/02* | (2009.01) |
| *H04B 7/185* | (2006.01) |
| *H01Q 1/28* | (2006.01) |
| *H01Q 21/20* | (2006.01) |
| *H04W 4/46* | (2018.01) |
| *H04W 76/14* | (2018.01) |
| *G08G 1/0967* | (2006.01) |

(52) U.S. Cl.
CPC ......... *H01Q 21/205* (2013.01); *H04B 7/0417* (2013.01); *H04B 7/0617* (2013.01); *H04B 7/0621* (2013.01); *H04B 7/0697* (2013.01); *H04B 7/18504* (2013.01); *H04B 7/18508* (2013.01); *H04L 9/0825* (2013.01); *H04L 63/061* (2013.01); *H04L 63/0823* (2013.01); *H04W 4/06* (2013.01); *H04W 4/46* (2018.02); *H04W 12/001* (2019.01); *H04W 12/02* (2013.01); *H04W 12/0401* (2019.01); *H04W 12/04031* (2019.01); *H04W 12/04071* (2019.01); *H04W 16/28* (2013.01); *H04W 76/14* (2018.02); *H04W 92/18* (2013.01); *B64C 2201/141* (2013.01); *B64C 2201/146* (2013.01); *G08G 1/096791* (2013.01)

(58) Field of Classification Search
CPC ... H04W 4/40; H04W 36/0005; H04W 36/34; H04W 84/18; H04W 4/70; H04W 4/48; H04W 8/06; H04W 36/32
See application file for complete search history.

(56) References Cited

U.S. PATENT DOCUMENTS

2017/0310674 A1  10/2017  Markham et al.
2018/0027600 A1*  1/2018  Lawlis ............... H04L 9/0869
                                                                 713/168

OTHER PUBLICATIONS

3rd Generation Partnership Project; Technical Specification Group Services and System Aspects; Study on Extended Architecture Support for Proximity-based Services (Release 13), 3GPP Standard; Technical Report; 3GPP TR 23.713, 3rd Generation Partnership Project (3GPP), Mobile Competence Centre; 650, Route Des Lucioles; F-06921 Sophia-Antipolis Cedex; France, vol. SA WG2, No. V13.0.0, Sep. 15, 2015, pp. 1-80, XP051294298, [retrieved on Sep. 15, 2015].

International Search Report and Written Opinion—PCT/US2018/063442—ISA/EPO—dated Feb. 11, 2019.

Samsung: "New Default ProSe Messages Rel-13 36508," 3GPP Draft; 36508_CR0979R1_(REL-14)_R5-174593, 3rd Generation Partnership Project (3GPP), Mobile Competence Centre; 650, Route Des Lucioles; F-06921 Sophia-Antipolis Cedex; France, vol. RAN WG5, no. Berlin, Germany; Aug. 21, 2017-Aug. 25, 2017, Sep. 4, 2017, XP051333484, 6 pages, Retrieved from the Internet: URL: http://www.3gpp.org/ftp/tsg_ran/WG5_Test_ex-T1/Working_documents/draft_CR_packs_for_RP-77/ [retrieved on Sep. 4, 2017].

* cited by examiner

| PARAMETER | SIZE (BYTES) | NOTES |
|---|---|---|
| IPv6 Address | 16 | IPv6 address of service provider UE |
| Service Port | 2 | UDP/TCP port of service provider UE |
| L2 Dest Address | 4 | Existing Rel 14 layer 2 address; address to be used by any subsequent service flows for this vehicle |
| LTE or NR Channel Index | ? | Info on the group of resources where the subsequent user data exchange is to take place |
| QoS Parameters | ? | PDB, PER aimed for in the unicast flow from the provider to recipient(s) |
| Other Radio Parameters | | Max Tx power the provider will use |
| Certificate | ? | Optional; as in signer field of BSMs |

FIG. 10

CELLULAR UNICAST LINK ESTABLISHMENT FOR VEHICLE-TO-VEHICLE (V2V) COMMUNICATION

PRIORITY CLAIM

This application claims priority to and the benefit of U.S. Provisional Application Ser. No. 62/617,281, entitled "CELLULAR V2X UNICAST LINK ESTABLISHMENT FOR NR PC5 V2V COMMUNICATION" filed on Jan. 14, 2018, the entire contents of which is incorporated herein by reference for all applicable purposes.

TECHNICAL FIELD

The technology discussed below relates generally to wireless communication systems, and more particularly, to establishing a secure link for vehicle-to-vehicle (V2V) communication.

INTRODUCTION

Cellular vehicle-to-everything (V2X) is a vehicular communication system enabling communications from a vehicle to any entity that may affect the vehicle, and vice versa. V2X may incorporate other more specific types of communication, e.g., vehicle-to-infrastructure (V2I), vehicle-to-vehicle (V2V), vehicle-to-pedestrian (V2P), vehicle-to-device (V2D), and vehicle-to-grid (V2G).

In 3GPP Release 14, LTE-based communication has been defined for a direct interface (e.g., PC5 interface) as well as for a network interface (e.g., Uu interface). Currently, V2V communication via the PC5 interface is broadcast. However, for later 3GPP releases (e.g. Release 16 and beyond), there is a need to establish unicast links between vehicles for advanced use cases. A use case for 1-to-1 or 1-to-many V2V link scenarios may involve the on-demand sharing of sensor data that cannot be supported over broadcast. Another use case may involve a see-through camera feed, such as when a first vehicle wishes to see in front of a second vehicle ahead of the first vehicle using the second vehicle's camera.

As the demand for unicast links between vehicles increases, solutions will be needed with respect to, for example, discovering whether another vehicle supports a unicast link service, initiating the setup of a unicast/multicast link, and establishing a long-term key as a basis to bootstrap link security.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to systems, methods, and devices for establishing a secure link for vehicle-to-vehicle (V2V) communication.

In one example, a method operable at a device for establishing a secure link for vehicle-to-vehicle (V2V) communication is disclosed. The method includes sending a service announcement message to at least one other device via PC5 layer signaling, the service announcement message indicating a capability of the device to perform a service and including at least a security certificate of the device. The method also includes establishing a secure link with the at least one other device corresponding to the service, wherein the establishing the secure link includes establishing a long-term key between the device and the at least one other device. The method further includes communicating service data between the device and the at least one other device via the secure link based on the established long-term key. The method also includes ending the communication of the service data based on at least one of the device failing to receive a direct communication keepalive message from the at least one other device, the device detecting that the least one other device is no longer in proximity, or the device receiving a request from the at least one other device to end the communication of the service data.

In another example, a device for establishing a secure link for vehicle-to-vehicle (V2V) communication is disclosed. The device includes at least one processor, a transceiver communicatively coupled to the at least one processor, and a memory communicatively coupled to the at least one processor. The at least one processor is configured to send a service announcement message to at least one other device via PC5 layer signaling, the service announcement message indicating a capability of the device to perform a service and including at least a security certificate of the device. The at least one processor is also configured to establish a secure link with the at least one other device corresponding to the service, wherein the establishing the secure link includes establishing a long-term key between the device and the at least one other device. The at least one processor is further configured to communicate service data between the device and the at least one other device via the secure link based on the established long-term key. The at least one processor is also configured to end the communication of the service data based on at least one of the device failing to receive a direct communication keepalive message from the at least one other device, the device detecting that the least one other device is no longer in proximity, or the device receiving a request from the at least one other device to end the communication of the service data.

In a further example, a device for establishing a secure link for vehicle-to-vehicle (V2V) communication is disclosed. The device includes means for sending a service announcement message to at least one other device via PC5 layer signaling, the service announcement message indicating a capability of the device to perform a service and including at least a security certificate of the device. The device also includes means for establishing a secure link with the at least one other device corresponding to the service, wherein the means for establishing the secure link includes means for establishing a long-term key between the device and the at least one other device. The device further includes means for communicating service data between the device and the at least one other device via the secure link based on the established long-term key. The device also includes means for ending the communication of the service data based on at least one of the device failing to receive a direct communication keepalive message from the at least one other device, the device detecting that the least one other device is no longer in proximity, or the device receiving a request from the at least one other device to end the communication of the service data.

In another example, a computer-readable medium storing computer-executable code for establishing a secure link at a device for vehicle-to-vehicle (V2V) communication is disclosed. The computer-readable medium includes code for causing a computer to send a service announcement message to at least one other device via PC5 layer signaling, the service announcement message indicating a capability of the device to perform a service and including at least a security certificate of the device. The code also causes the computer to establish a secure link with the at least one other device corresponding to the service, wherein the establishing the secure link includes establishing a long-term key between the device and the at least one other device. The code further causes the computer to communicate service data between the device and the at least one other device via the secure link based on the established long-term key. The code also causes the computer to end the communication of the service data based on at least one of the device failing to receive a direct communication keepalive message from the at least one other device, the device detecting that the least one other device is no longer in proximity, or the device receiving a request from the at least one other device to end the communication of the service data.

In one example, a method operable at a device for establishing a secure link for vehicle-to-vehicle (V2V) communication is disclosed. The method includes receiving a service announcement message from a second device via sidelink signaling, the service announcement message indicating a capability of the second device to perform a service and including at least a security certificate of the second device. The method also includes establishing a secure link with the second device corresponding to the service, wherein the establishing the secure link includes establishing a device key between the device and the second device. The method further includes communicating service data for the service between the device and the second device via the secure link based on the established device key. The method also includes ending the communication of the service data based on at least one of the device failing to send a direct communication keepalive message to the second device, the device no longer being in proximity to the second device, the device sending a request to the second device to end the communication of the service data.

In another example, a device for establishing a secure link for vehicle-to-vehicle (V2V) communication is disclosed. The device includes at least one processor, a transceiver communicatively coupled to the at least one processor, and a memory communicatively coupled to the at least one processor. The at least one processor is configured to receive a service announcement message from a second device via sidelink signaling, the service announcement message indicating a capability of the second device to perform a service and including at least a security certificate of the second device. The at least one processor is also configured to establish a secure link with the second device corresponding to the service, wherein the establishing the secure link includes establishing a device key between the device and the second device. The at least one processor is further configured to communicate service data for the service between the device and the second device via the secure link based on the established device key. The at least one processor is also configured to end the communication of the service data based on at least one of the device failing to send a direct communication keepalive message to the second device, the device no longer being in proximity to the second device, the device sending a request to the second device to end the communication of the service data.

In a further example, a device for establishing a secure link for vehicle-to-vehicle (V2V) communication is disclosed. The device includes means for receiving a service announcement message from a second device via sidelink signaling, the service announcement message indicating a capability of the second device to perform a service and including at least a security certificate of the second device. The device also includes means for establishing a secure link with the second device corresponding to the service, wherein the means for establishing the secure link includes means for establishing a device key between the device and the second device. The device further includes means for communicating service data for the service between the device and the second device via the secure link based on the established device key. The device also includes means for ending the communication of the service data based on at least one of the device failing to send a direct communication keepalive message to the second device, the device no longer being in proximity to the second device, the device sending a request to the second device to end the communication of the service data.

In another example, a computer-readable medium storing computer-executable code for establishing a secure link at a device for vehicle-to-vehicle (V2V) communication is disclosed. The computer-readable medium includes code for causing a computer to receive a service announcement message from a second device via sidelink signaling, the service announcement message indicating a capability of the second device to perform a service and including at least a security certificate of the second device. The code also causes the computer to establish a secure link with the second device corresponding to the service, wherein the establishing the secure link includes establishing a device key between the device and the second device. The code further causes the computer to communicate service data for the service between the device and the second device via the secure link based on the established device key. The code also causes the computer to end the communication of the service data based on at least one of the device failing to send a direct communication keepalive message to the second device, the device no longer being in proximity to the second device, the device sending a request to the second device to end the communication of the service data.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10 illustrates a table 1002 depicting the contents of a service announcement message.

DETAILED DESCRIPTION

Figure 1:
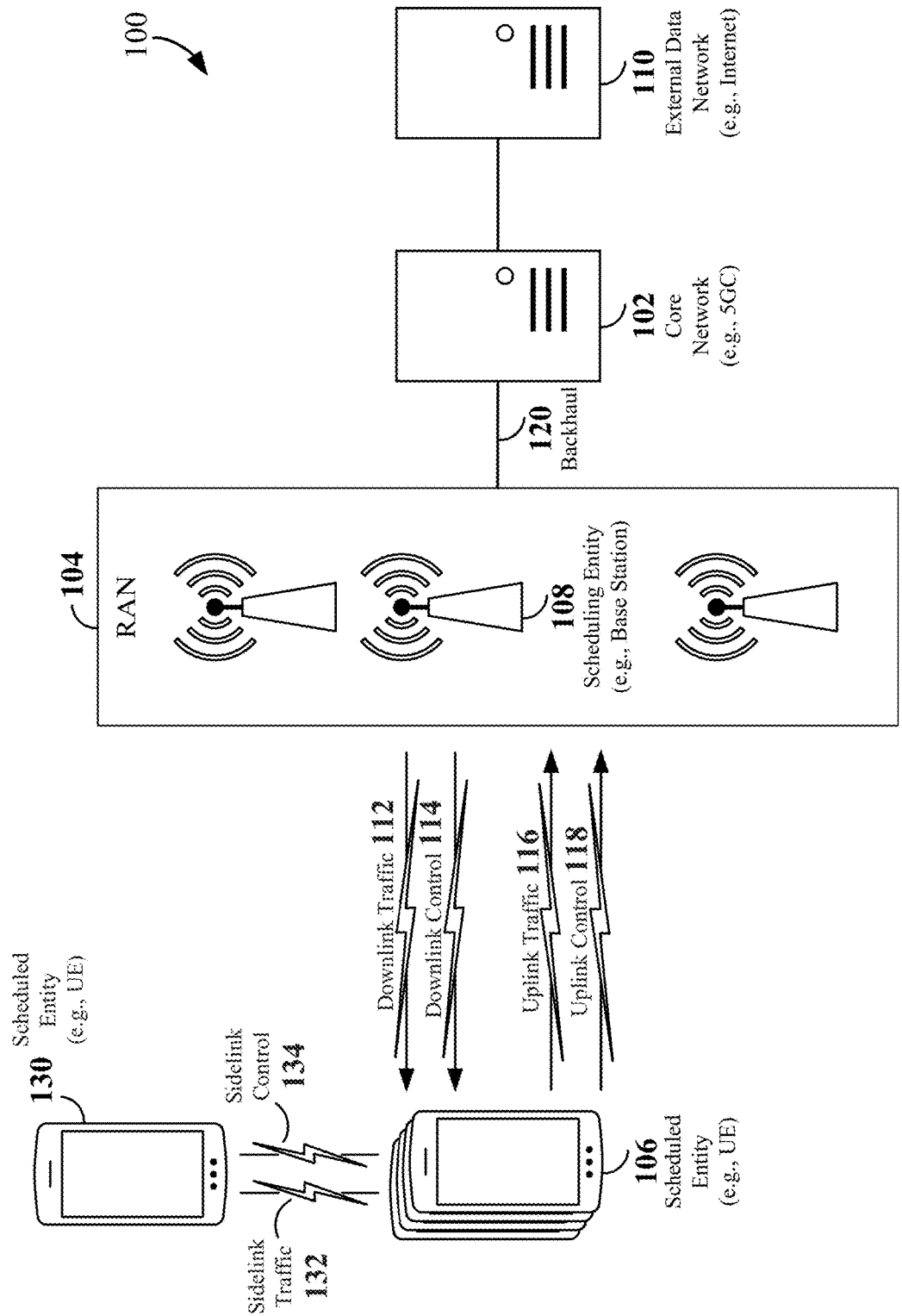
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Cellular vehicle-to-everything (V2X) is a vehicular communication system enabling communications from a vehicle to any entity that may affect the vehicle, and vice versa. V2X may incorporate other more specific types of communication, such as vehicle-to-vehicle (V2V) communications. V2V communications are based on device-to-device (D2D) communications (which may be referred to as ProSe communications or sidelink communications). Moreover, V2V communications utilize a D2D interface designated as a PC5 interface (also known as sidelink interface at a physical layer), which has been enhanced for vehicular use cases, specifically addressing high speed and high density (large number of nodes) issues. Aspects of the present disclosure relate to utilizing security certificates tied to a vehicle-to-everything (V2X) service to establish keys for an associated unicast/groupcast link associated with such services. It may also be possible to link back to periodic safety messages or basic safety messages (BSMs) even though the security certificates used may be different. Other aspects relate to announcing service and security certificate information in a new PC5 signaling message. Further aspects relate to adapting a ProSe D2D/sidelink security procedure to support key derivation and different usages based on the security certificate for V2X communication.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
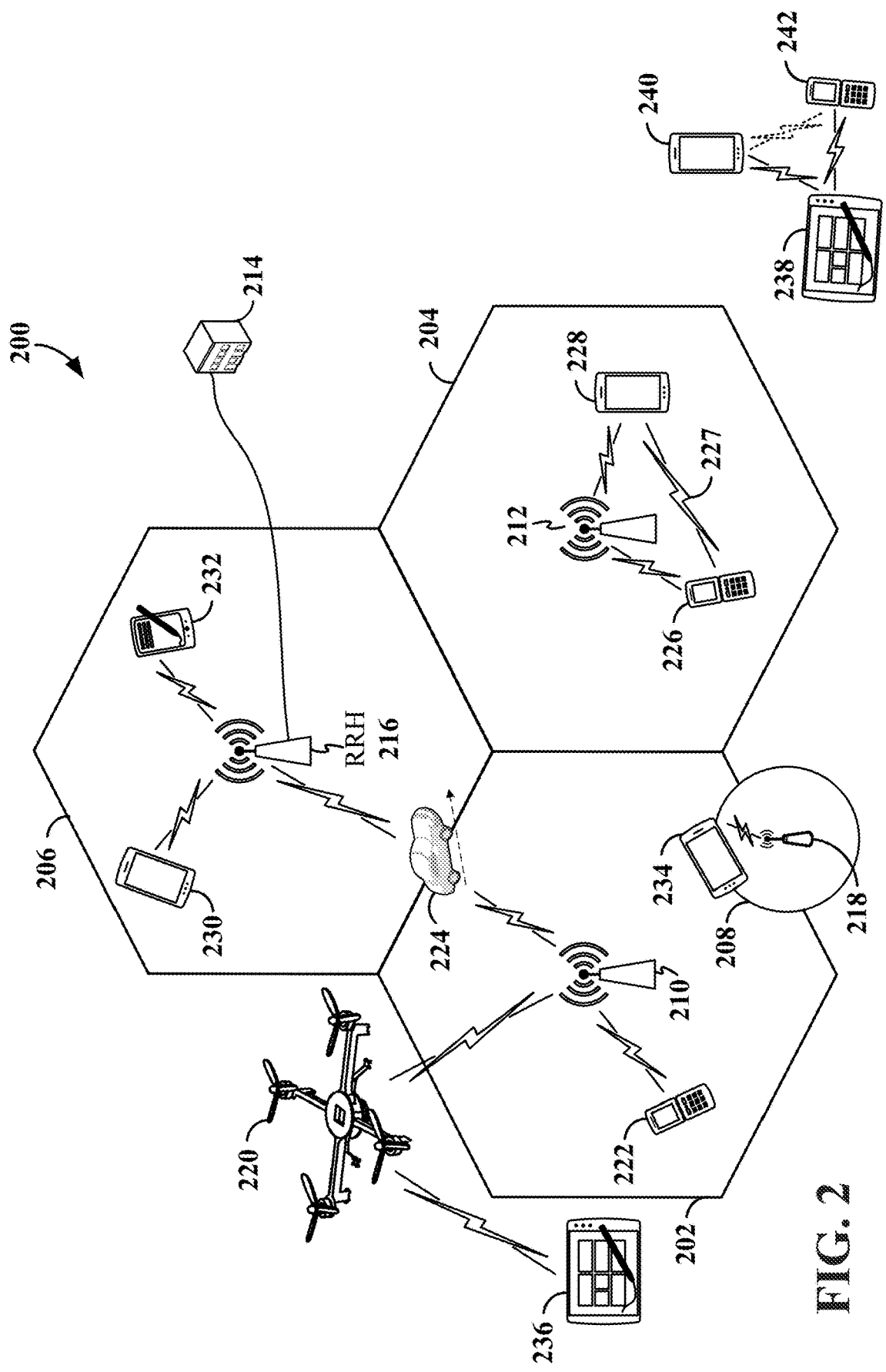
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In some examples, scheduled entities such as a first scheduled entity 106 and a second scheduled entity 130 may utilize sidelink signals for direct D2D communication. Sidelink signals may include sidelink traffic 132 and sidelink control 134. Sidelink control information 134 may in some examples include a request signal, such as a request-to-send (RTS), a source transmit signal (STS), and/or a direction selection signal (DSS). The request signal may provide for a scheduled entity 106 or 130 to request a duration of time to keep a sidelink channel available for a sidelink signal. Sidelink control information 134 may further include a response signal, such as a clear-to-send (CTS) and/or a destination receive signal (DRS). The response signal may provide for the scheduled entity 106 or 130 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 132.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
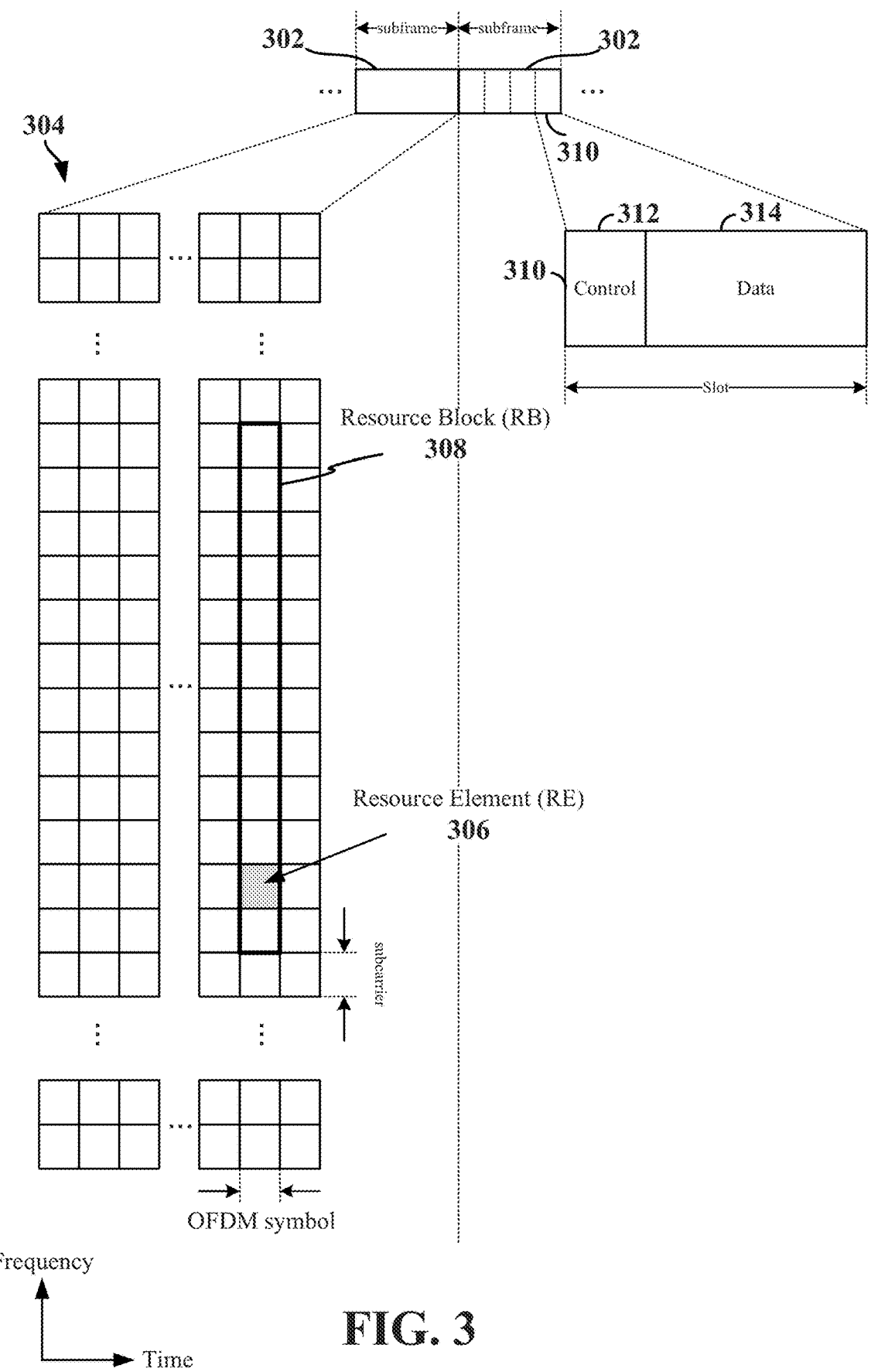
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 106) may utilize one or more REs 306 to carry UL control information 118 originating from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Aspects of the present disclosure relate to applying encryption and/or integrity protection to vehicle-to-vehicle (V2V) communications. The type of protection and at which layer to apply the protection will be discussed. According to certain aspects, encryption protection may not be necessary, integrity protection may be necessary to prevent replays, and physical (PHY) layer jamming attacks may not be mitigated.

When encryption protection is applied using modern block ciphering, the encryption may cause small changes that have extensive negative effects. A disadvantage of modern block ciphering is that if encrypted, even one bit error in a received image can render the image useless after decryption. For example, when there are errors not caught by a cyclic redundancy check (CRC) in a frame, if only encryption is applied, a packet data convergence protocol (PDCP) layer will decrypt a protocol data unit (PDU) and send it to an application. The application will be able to tell that the frame was corrupted. An upper layer is not able to distinguish between an uncorrected channel error and malicious traffic injection.

When encryption protection is applied using modern stream ciphering, the encryption may cause small changes to remain contained. With stream ciphers, an attacker knowing just the structure of a message can modify an encrypted message and adjust the CRC so that its modification is undetected. Hence, stream encryption does not detect data tampering by attackers. Stream ciphers may not even be one of the PDCP algorithms and may not be able to detect replay due to PDCP Seq.NR that is stream-encrypted. As such, integrity protection may be more valuable than encryption protection in V2V communications.

When integrity protection is applied using message authorization codes, corrupted data blocks are detected via MAC failure. The MAC failure will result in PDCP PDU discarding. Since an upper layer may not provide integrity protection, bearer-level integrity protection is provided.

Figure 4:
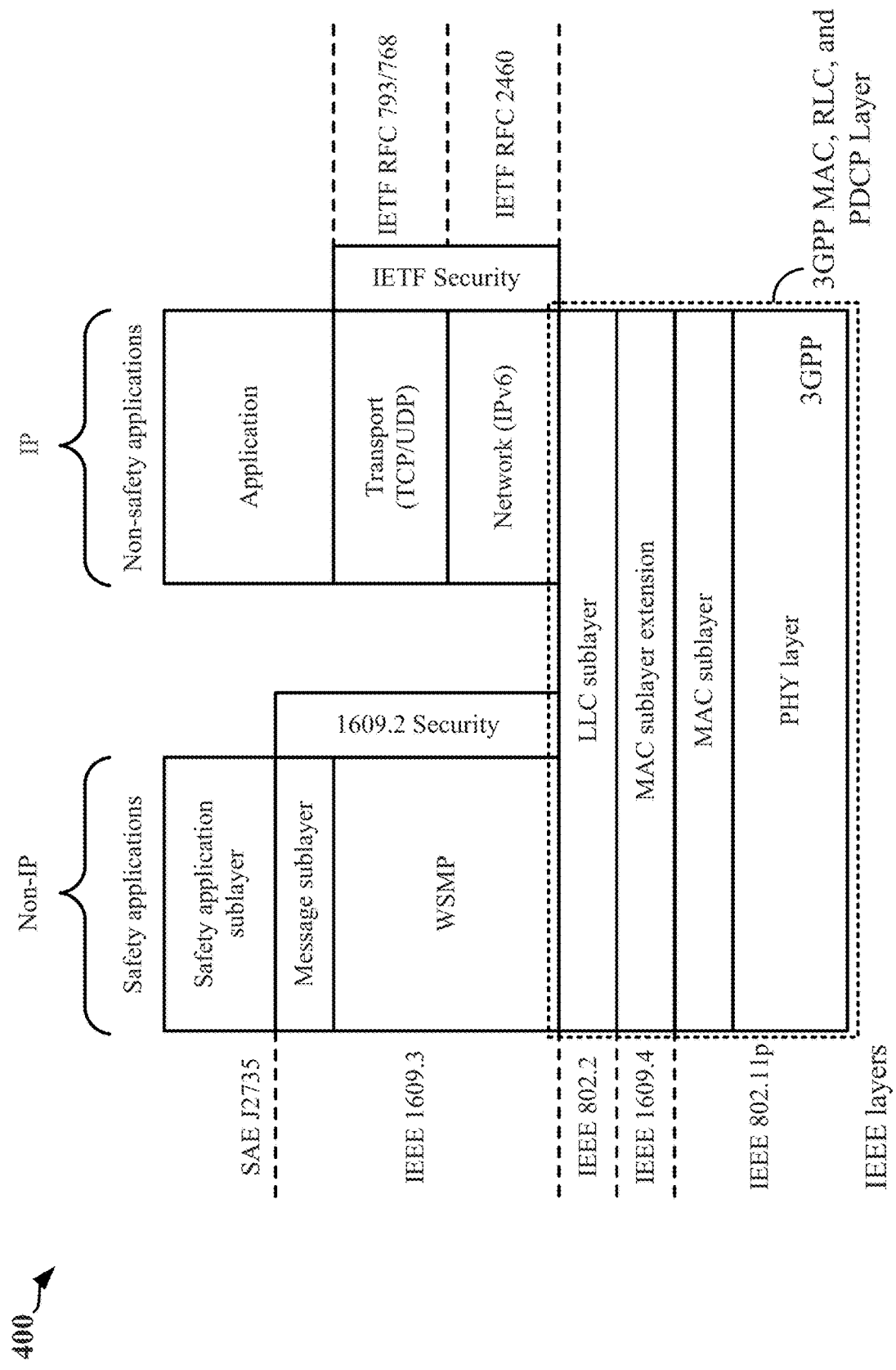
FIG. 4 illustrates a protocol layer stack depicting the adaptation of communication standards to provide data protection for vehicle-to-vehicle (V2V)/vehicle-to-pedestrian (V2P) links.

FIG. 4 illustrates a protocol layer stack 400 depicting the adaptation of communication standards to provide data protection for vehicle-to-vehicle (V2V)/vehicle-to-pedestrian (V2P) links Data protection may apply to both Internet Protocol (IP) and non-IP applications.

In an aspect, for IP applications (e.g., non-safety applications), data protection may be applied at an open systems interconnection (OSI) layer, such as a transport layer security (TLS) record layer. The data protection may use the IPv6 protocol and may be covered partly in Internet Engineering Task Force (IETF) IP Wireless Access in Vehicular Environments (IP-WAVE) protocols.

In a further aspect, for non-IP application (e.g., safety applications), data protection may be applied at an Intelligent Transportation Systems (ITS) message/transport layer. This is similar to basic safety message (BSM) protection, which is labeled as "app-layer" in 3GPP. Notably, IEEE 1609.2 may not provide for an integrity protection-only mode, just encryption protection.

Data protection may also be applied at a 3GPP PDCP layer similar to a ProSe/D2D communication system. The data protection is applicable to PC5 transport. This is more efficient/robust to vehicular communication, supports all types of traffic, and does not prohibit security at upper layers. Details for establishing long term keys will be described below.

Aspects of the present disclosure relate to securing unicast link establishment based on PC5 signaling. In some aspects, security certificates tied to a vehicle-to-everything (V2X) service may be utilized to establish keys for an associated unicast/groupcast link associated with such services. It may also be possible to link back to periodic safety messages or basic safety messages (BSMs) even though the security certificates used may be different. Other aspects relate to announcing service and security certificate information in a new PC5 signaling message. Further aspects relate to adapting a ProSe D2D/sidelink security procedure to support key derivation and different usages based on the security certificate for V2X communication. Additional aspects related to impacting 3GPP standard specifications. For example, a definition of a new PC5 message for V2X communication potentially as part of V2X message headers (CT1) or MAC CE (RAN2) is provided. Moreover, a definition of a new information element (Info Element), and modification of a security procedure and key management in SA3, is provided.

Figure 5:
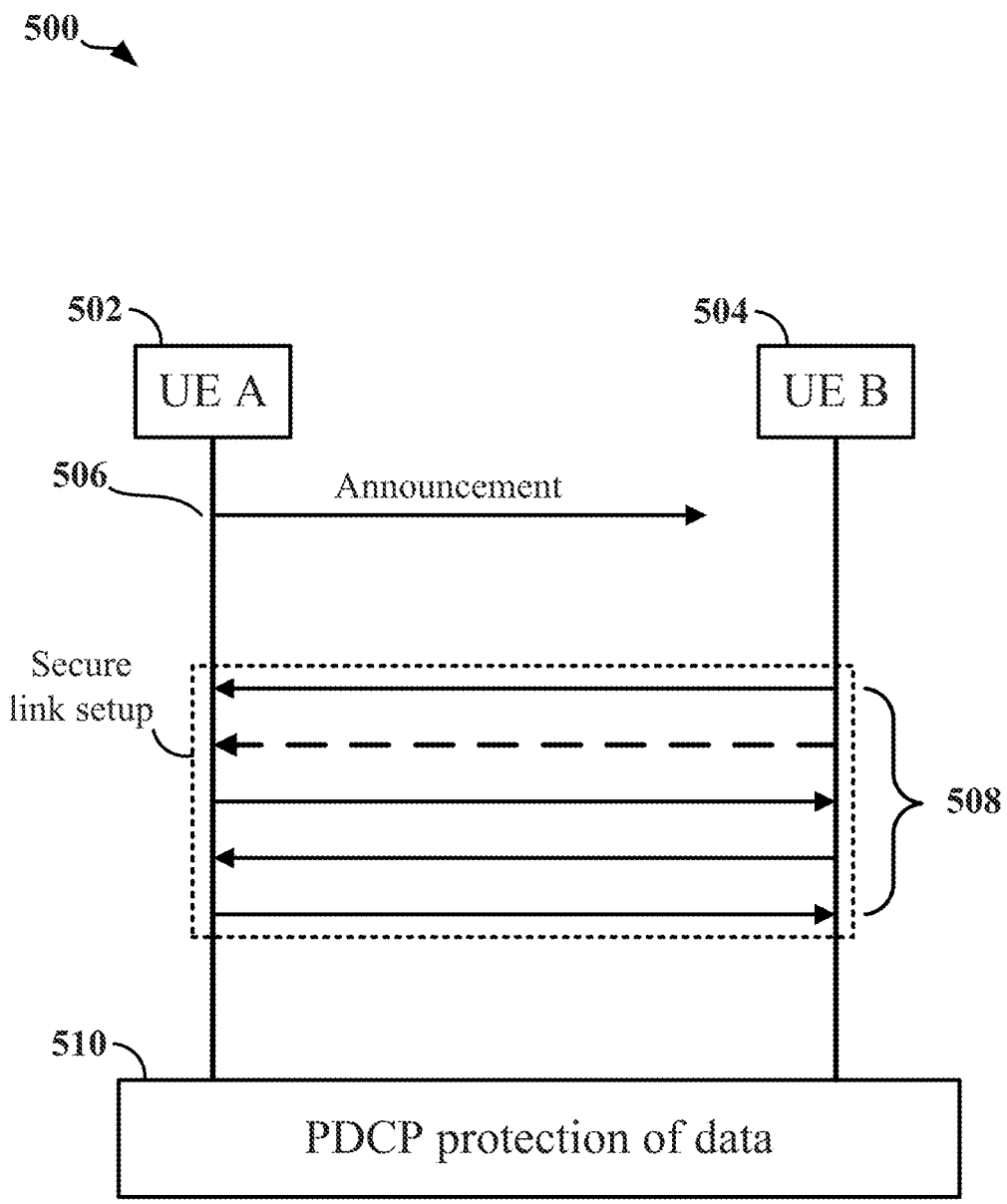
FIG. 5 illustrates a flow diagram depicting PC5 layer signaling for secure unicast link establishment.

FIG. 5 illustrates a flow diagram 500 depicting PC5 layer signaling for secure unicast link establishment. In general, a high-level message flow may be as follows. First, a UE may announce that it supports a sensor streaming service (e.g., camera feed service). The announcement may be sent via a New Service Announce message on a PC5 interface. No vehicle information is included in the announcement. The announcement may be linked to a basic safety message (BSM) based on vehicle ID or source L2ID since the BSM contains vehicle information to decide on the use of the unicast link The announcement may include a certificate/signature for service announcements. The certificate may be different from a BSM certificate. Notably, IEEE 1609.2 certificates include PSID and SSP. Thus, it is possible that BSM certificates only have the PSID of safety messages, and another certificate is required for the vehicles that wish to provide a service. Once the announcement is sent, a credential may be established. For example, a session key encrypted with a recipient's public key may be sent. Thereafter, a three-way handshake may be run based on 3GPP Release 13 one-to-one ProSe communication.

In an aspect, it may be assumed that UEs have certificates that are known to other UEs via signed messages. Referring to FIG. 5, if a link is to be set up between a first UE 502 (UE A) and a second UE 504 (UE B) (unicast case), either the first UE 502 (UE A) or the second UE 504 (UE B) may choose a key. However, if a link is to be setup between the first UE 502 (UE A) and a group of other UEs (multicast case), the first UE 502 (UE A) may choose a group key.

As shown in FIG. 5, the first UE 502 (UE A) may send an announcement 506 indicating that the first UE 502 supports a sensor streaming service. The announcement 506 may be a New Service Announce message sent via PC5 signaling. The announcement message 506 may include upper layer parameters (e.g., IP/UDP port numbers) and is signed with the first UE 502's key. The announcement message 506 may also include an identification (set) of current keys for a group of UEs in case a link is to be setup between the first UE 502 (UE A) and the group of UEs (multicast use case).

Thereafter, a secure link may be setup via a handshake operation 508. In an aspect, the link is setup by adapting a one-to-one ProSe communication operation. For example, during unicast link setup, the second UE 504 (UE B) may send a direct communication request to the first UE 502 (UE A) via an information element (IE) in a first message carrying a symmetric key that is encrypted. Alternatively, the second UE 504 (UE B) may send the direct communication request separately from the symmetric key. In another example, during a multicast link setup, the second UE 504 (UE B) may send a generic request or a direct communication request to the first UE 502 (UE A). Thereafter, the first UE 502 (UE A) may send a group key to all UEs (including the second UE 504 (UE B)) from which a request was received.

When the link is setup, user plane traffic between the first UE 502 (UE A) and the second UE 504 (UE B) (unicast use case), or between the first UE 502 (UE A) and a group of UEs (multicast use case), is PDCP layer security protected 510. In an aspect, an integrity protection-only mode may be provided for V2X use.

Figure 6:
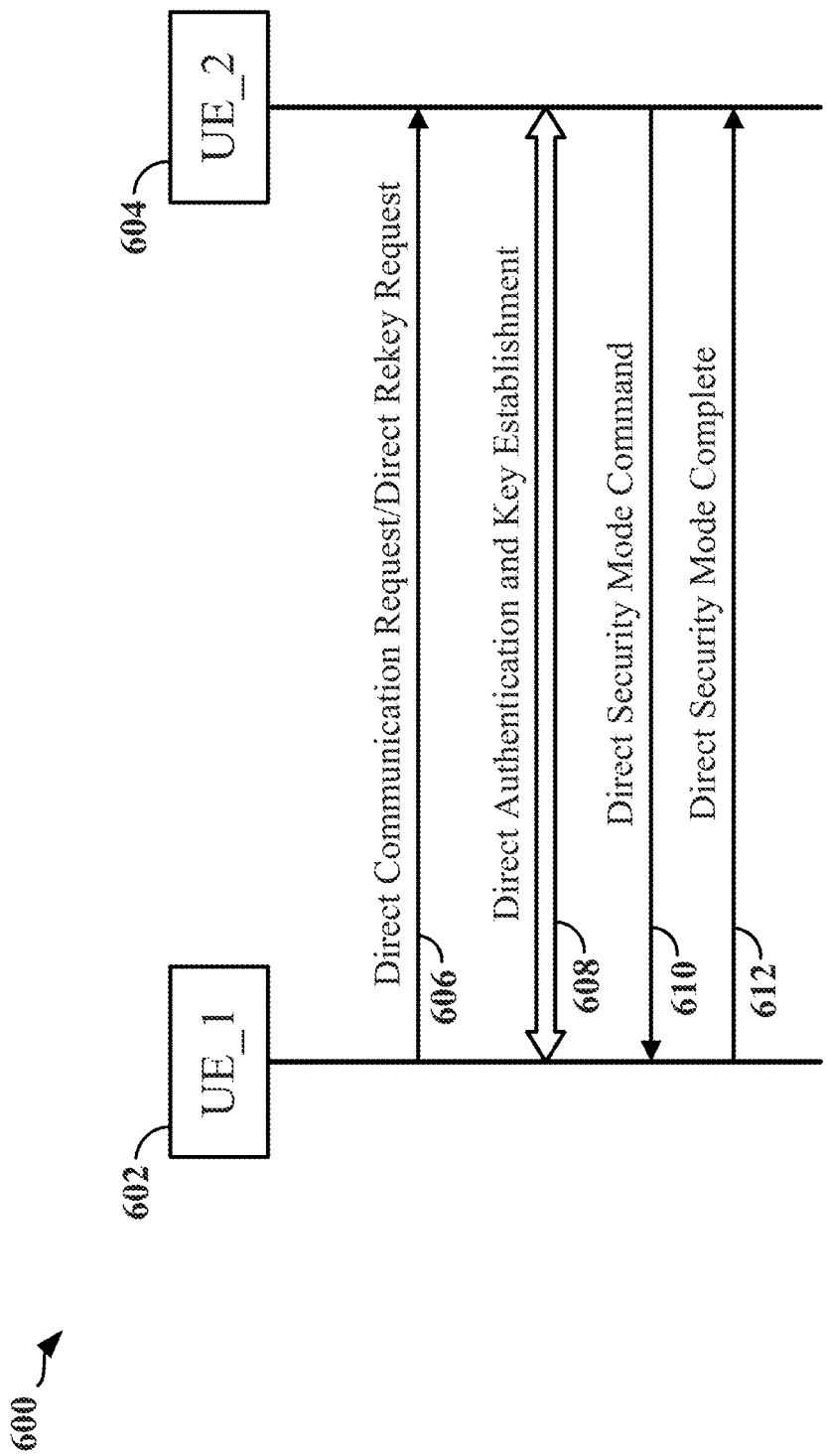
FIG. 6 illustrates a flow diagram of an overview for establishing a secure link between UEs.

FIG. 6 illustrates a flow diagram 600 of an overview for establishing a secure link between UEs. A security system may leverage the credentials that are present, e.g., temporary certificates for BSMs signing or a certificate for a service provider. In an aspect, the security system may adapt a 3GPP ProSe one-to-one communications protocol (TS 33.303, clause 6.5), such as a three-way handshake protocol with overlaid/optional use-case-specific "Direct Authentication and Key Establishment" as shown in FIG. 6.

Referring to FIG. 6, a first UE 602 (UE_1) may send a direct communication request/direct rekey request message 606 to a second UE 604 (UE_2). Thereafter, the first UE 602 (UE_1) and the second UE 604 (UE_2) may optionally perform direct authentication and key establishment 608. The second UE 604 (UE_2) then sends a direct security mode command message 610 to the first UE 602 (UE_1). Finally, the first UE 602 (UE_1) sends a direct security mode complete message 612 to the second UE 604 (UE_2). Upon the sending of the direct security mode complete message 612, data exchanged between the first UE 602 (UE_1) and the second UE 604 (UE_2) is securely encrypted and/or integrity protected.

In an aspect, the first UE 602 (UE_1) and the second UE 604 (UE_2) may not perform the direct authentication and key establishment 608 procedure. The UEs may secure the link by only performing the other procedures in the flow of FIG. 6 (e.g., steps 606, 610, and 612).

In another aspect, when the direct authentication and key establishment 608 procedure is performed, the first UE 602 (UE_1) and the second UE 604 (UE_2) may exchange messages for establishing a long-term key. These messages may be carried on top of the PC5 signaling. The protocols used may include well-known protocols, such as EAP-TLS or other EAP exchanges, Diffie Hellman Key exchange, etc., and may be run over IP.

In a further aspect, when the direct authentication and key establishment 608 procedure is performed, the long-term key may be sent via a new PC5 signaling message sent by the first UE 602 (UE_1) or the second UE 604 (UE-2). The new PC5 signaling message may be called, for example, Key Exchange, which may contain a long-term device key ($K_D$) encrypted with another UE's public key.

Figure 7:
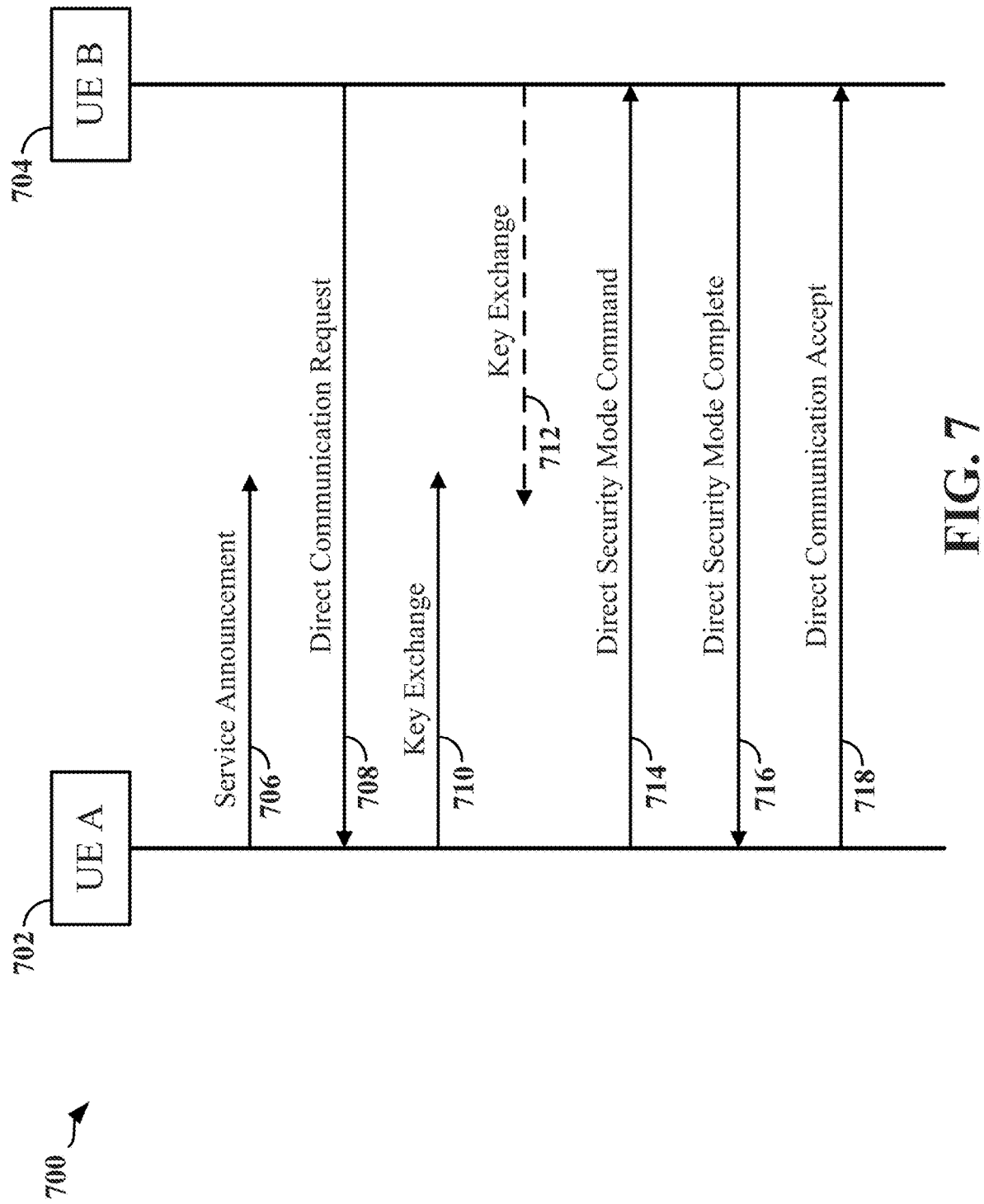
FIG. 7 illustrates a first example of a unicast secure session setup message flow.

FIG. 7 illustrates a first example of a unicast secure session setup message flow 700. A first UE 702 (UE A) may send a service announcement 706 indicating that the first UE 702 (UE A) supports a sensor streaming service. For example, the service announcement 706 may be a New Service Announce message sent via PC5 signaling. Thereafter, a second UE 704 (UE B) may send a direct communication request 708 to the first UE 702 (UE A). The direct communication request 708 may include user information, such as the second UE 704's (UE B's) certificate, formatted according to IEEE 1609.2, for example. The direct communication request message 708 may also include other parameters as defined previously and defined below.

The first UE 702 (UE A) may send a first Key Exchange message 710 to the second UE 704 (UE B). The first Key Exchange message 710 may include user information that may optionally be set to the first UE 702's (UE A's) certificate, a user key that may be set to a device key $K_D$ selected by the first UE 702 (UE A) and encrypted with the second UE 704's (UE B's) public key, and the $K_D$ ID selected by the first UE 702 (UE A). Alternatively, the second UE 704 (UE B) may send a second Key Exchange message 712 to the first UE 702 (UE A). The second Key Exchange message 712 may include user information that may optionally be set to the second UE 704's (UE B's) certificate, a user key that may be set to a device key $K_D$ selected by the second UE 704 (UE B) and encrypted with the first UE 702's (UE A's) public key, and the $K_D$ ID selected by the second UE 704 (UE B). In an aspect, the first UE 702 (UE A) and the second UE 704 (UE B) may both send their respective Key Exchange messages 710, 712 if each of the first UE 702 (UE A) and the second UE 704 (UE B) sends half of the $K_D$.

After communication of the Key Exchange message(s), the first UE 702 (UE A) sends a direct security mode command message 714 to the second UE 704 (UE B). The direct security mode command message 714 is MACed and may include user information that is optionally set to the first UE 702's (UE A's) certificate. The direct security mode command message 714 may also include other parameters as defined previously and defined below.

Thereafter, the second UE 704 (UE B) sends a direct security mode complete message 716 to the first UE 702 (UE A). The direct security mode complete message 716 is encrypted and MACed, and may include the least significant byte (LSB) of the $K_D$ ID.

Finally, the first UE 702 (UE A) sends a direct communication accept message 718 to the second UE 704 (UE B). Upon the sending of the direct communication accept message 718, data exchanged between the first UE 702 (UE A) and the second UE 704 (UE B) is securely encrypted and/or integrity protected.

Figure 8:
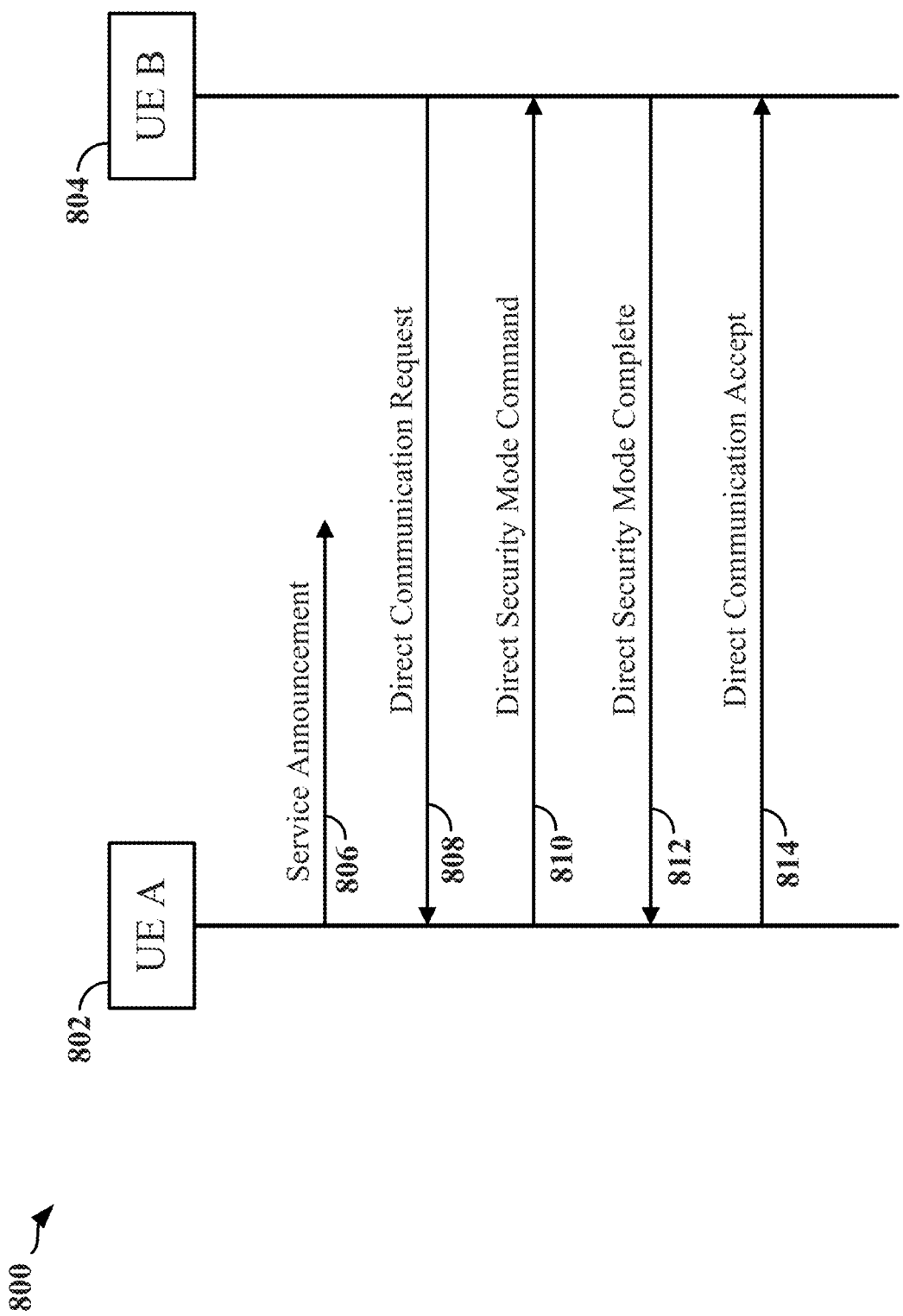
FIG. 8 illustrates a second example of a unicast secure session setup message flow.

FIG. 8 illustrates a second example of a unicast secure session setup message flow 800. A first UE 802 (UE A) may send a service announcement 806 indicating that the first UE 802 supports a sensor streaming service. For example, the service announcement 806 may be a New Service Announce message sent via PC5 signaling. Thereafter, a second UE 804 (UE B) may send a direct communication request 808 to the first UE 802 (UE A). The direct communication request 808 may include user information, such as the second UE 804's (UE B's) certificate, formatted according to IEEE 1609.2, for example.

In one aspect, the direct communication request message 808 may also include other parameters, such as an IP address configuration, a Nonce_1 parameter, UE security capabilities, and the most significant byte (MSB) of a $K_D$ session ID. The IP address configuration may be set to a link local IPv6 address. The Nonce_1 parameter may be a "$K_D$ freshness" parameter and may be randomly chosen. The UE security capabilities may be a list of algorithms supported at the second UE 804 (UE B). The MSB of the $K_D$ session ID may be a randomly chosen 8-bit parameter.

After receiving the direct communication request message 808, the first UE 802 (UE A) sends a direct security mode command message 810 to the second UE 804 (UE B). The direct security mode command message 810 is MACed and may include user information that is optionally set to the first UE 802's (UE A's) certificate. The direct security mode command message 810 may also include other parameters, such as a user key, a Nonce_2 parameter, the least significant byte (LSB) of the $K_D$ session ID, UE security capabilities, and a chosen algorithm. The user key may be set to the $K_D$ encrypted with the second UE 804's (UE B's) public key formatted according to IEEE 1609.2, for example. The Nonce_2 parameter may be a "$K_D$ freshness" parameter and may be randomly chosen. The LSB of the $K_D$ session ID may be a randomly chosen 8-bit parameter. The UE security capabilities may be set to be the same as the list of algorithms included in the direct communication request message 808. The chosen algorithm may be an algorithm selected from the list of algorithms in the UE security capabilities.

Thereafter, the second UE 804 (UE B) sends a direct security mode complete message 812 to the first UE 802 (UE A). The direct security mode complete message 812 is encrypted and MACed, and may include the least significant byte (LSB) of the $K_D$ ID.

Finally, the first UE 802 (UE A) sends a direct communication accept message 814 to the second UE 804 (UE B). Upon the sending of the direct communication accept message 814, data exchanged between the first UE 802 (UE A) and the second UE 804 (UE B) is securely encrypted and/or integrity protected.

In an alternative aspect, the direct communication request message 808 includes user information, such as the second UE 804's (UE B's) certificate, formatted according to IEEE 1609.2, for example, and other parameters, such as a user key, an IP address configuration, a Nonce_1 parameter, UE security capabilities, and the most significant byte (MSB) of a $K_D$ session ID. The user key may be set to the $K_D$ encrypted with the first UE 802's (UE A's) certificate from service announcement, formatted according to IEEE 1609.2, for example. The IP address configuration may be set to a link local IPv6 address. The Nonce_1 parameter may be a "$K_D$ freshness" parameter and may be randomly chosen. The UE security capabilities may be a list of algorithms supported at the second UE 804 (UE B). The MSB of the $K_D$ session ID may be a randomly chosen 8-bit parameter.

After receiving the direct communication request message 808, the first UE 802 (UE A) sends a direct security mode command message 810 to the second UE 804 (UE B). The direct security mode command message 810 is MACed and may include parameters, such as a Nonce_2 parameter, the least significant byte (LSB) of the $K_D$ session ID, UE security capabilities, and a chosen algorithm. The Nonce_2 parameter may be a "$K_D$ freshness" parameter and may be randomly chosen. The LSB of the $K_D$ session ID may be a randomly chosen 8-bit parameter. The UE security capabilities may be set to be the same as the list of algorithms included in the direct communication request message 808. The chosen algorithm may be an algorithm selected from the list of algorithms in the UE security capabilities.

Thereafter, the second UE 804 (UE B) sends a direct security mode complete message 812 to the first UE 802 (UE A). The direct security mode complete message 812 is encrypted and MACed, and may include the least significant byte (LSB) of the $K_D$ ID.

Finally, the first UE 802 (UE A) sends a direct communication accept message 814 to the second UE 804 (UE B). Upon the sending of the direct communication accept message 814, data exchanged between the first UE 802 (UE A) and the second UE 804 (UE B) is securely encrypted and/or integrity protected.

Figure 9:
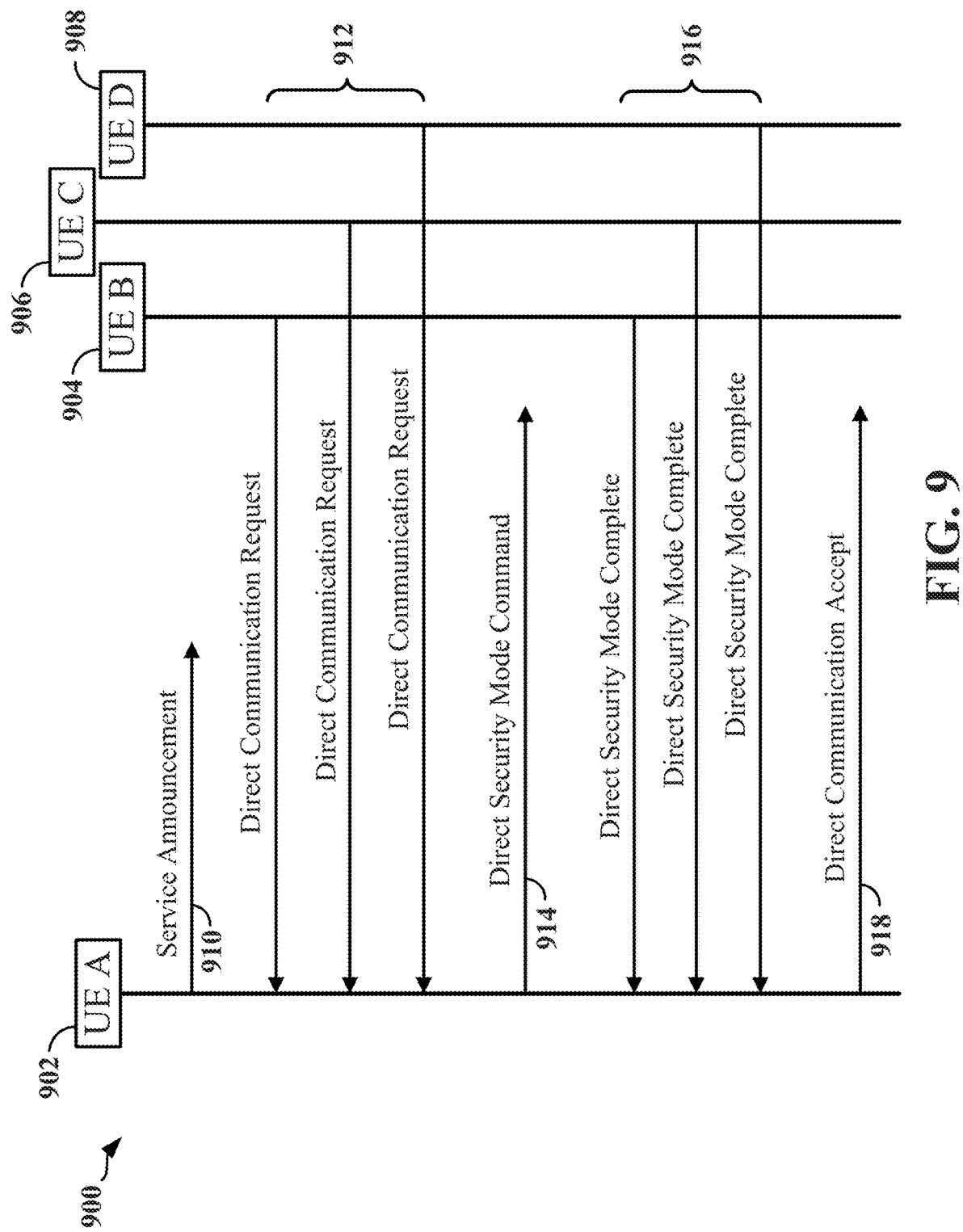
FIG. 9 illustrates an example of a multicast secure session setup message flow.

FIG. 9 illustrates an example of a multicast secure session setup message flow 900. A first UE 902 (UE A) may broadcast a service announcement 910 indicating that the first UE 902 (UE A) supports a sensor streaming service. For example, the service announcement 910 is a New Service Announce message sent via PC5 signaling. Amongst the UEs that receive the service announcement message 910, there could be a set of UEs, such as a second UE 904 (UE B), a third UE 906 (UE C), and a fourth UE 908 (UE D), that are actually interested in receiving the service. Thereafter, the second UE 904 (UE B), the third UE 906 (UE C), and the fourth UE 908 (UE D) may each send a direct communication request 912 to the first UE 902 (UE A). Each direct communication request 912 may include user information, such as the sending UE's certificate, formatted according to IEEE 1609.2, for example.

Each direct communication request message 912 may also include other parameters, such as an IP address configuration and UE security capabilities. The IP address configuration may be set to a link local IPv6 address. The UE security capabilities may be a list of algorithms supported at the sending UE.

After receiving the direct communication request messages 912, the first UE 902 (UE A) sends a direct security mode command message 914 to the group of UEs. The direct security mode command message 914 is MACed and sent to a multicast Layer 2 (L2) destination address or a multicast IPv6 address. The direct security mode command message 912 includes user information that is set to the first UE 902's (UE A's) certificate, formatted according to IEEE 1609.2, for example. The direct security mode command message 912 also includes other parameters, such as information elements related to a user key, a Nonce_2 parameter, a $K_D$ session ID, UE security capabilities, and a chosen algorithm. The information elements related to the user key may include information elements set to the $K_D$ encrypted with the public keys of the group of UEs, respectively, e.g., an information element set to the $K_D$ encrypted with the second UE 904's (UE B's) public key, an information element set to the $K_D$ encrypted with the third UE 906's (UE C's) public key, and an information element set to the $K_D$ encrypted with the fourth UE 908's (UE D's) public key. The Nonce_2 parameter may be a "$K_D$ freshness" parameter and may be randomly chosen. The $K_D$ session ID may be set to a randomly chosen 16-bit parameter. The UE security capabilities may be set to the union of the list of algorithms included in the received direct communication messages 912. The chosen algorithm may be an algorithm selected from the union of the list of algorithms in the UE security capabilities.

Thereafter, the second UE 904 (UE B), the third UE 906 (UE C), and the fourth UE 908 (UE D), may each send a direct security mode complete message 916 to the first UE 902 (UE A). Each direct security mode complete message 916 is encrypted and MACed, and may include the least significant byte (LSB) of the $K_D$ ID.

Finally, the first UE 902 (UE A) sends a direct communication accept message 918 to the group of UEs. Upon the sending of the direct communication accept message 918, data exchanged between the first 902 (UE A) and the group of UEs is securely encrypted and/or integrity protected.

In an aspect of the disclosure, a number of options exist for deriving a key. In one option, a ProSe one-to-one communication operation may be closely followed. Therefore, the key may be derived based on $K_D$. For $K_D$, a key generated by the first UE 902 (or the second UE 904 (UE B)) may be used and sent in a new user key parameter, which may be given by upper layers. The key is encrypted with the public key of the recipient. Thereafter, an algorithm (e.g., algorithm in annex A.9 of TS33.303) may be used to input two Nonces and the $K_D$ to obtain a $K_D$-sess for a session.

In another option, the ProSe one-to-one communication operation may be simplified. Instead of sending $K_D$, $K_D$-sess may be sent in the user key parameter. This makes fast rekey not possible. Moreover, Nonces are not needed and can be set to zero. The algorithm to derive $K_D$ is not applied.

Regardless of the above, the step of deriving a ProSe encryption key (PEK) and a ProSe integrity key (PIK) from KD-sess still applies. Only the PIK is used for data.

FIG. 10 illustrates a table 1000 depicting the contents of a service announcement message. The service announcement message may be sent in a new PC5 signaling protocol message. For security, the service announcement message has upper layer security similar to BSMs: IEEE 1609.2 security fields (header/trailer) or the PC5 equivalent of those. Integrity is needed, and the certificate of the sender is useful as well so that it does not have to be sent separately. A header may have a full certificate, not a digest. Alternatively, the service announcement message may include an announcer's certificate in a PC5-Signaling (PC5-S) field.

According to aspects of the disclosure, for unicast and multicast links, service can end in a number of ways. In one example, a recipient can send a direct-communication-keepalive message periodically (e.g., every 2 seconds). Such message may be defined in TS 24.334. When a service provider does not receive several keepalive messages, the service provider ends the service flow.

In another example, the service provider may assume that the recipient desires the service as long as the recipient is in proximity to the service provider. Thus, the service provider can rely on the periodic BSMs heard from the recipient to determine whether the recipient is still in proximity.

In a further example, the recipient can specifically request the ending of the service via a direct-communication-release message. Such message may be defined in 3GPP TS 24.334 and should be integrity protected.

In another example, the recipient can specifically request the ending of the service via a message similar to the service announcement message. For example, a service termination message may contain some of the parameters of the service announcement message that the provider sent, e.g., IP address and port numbers. No lower layer information may be needed.

Figure 11:
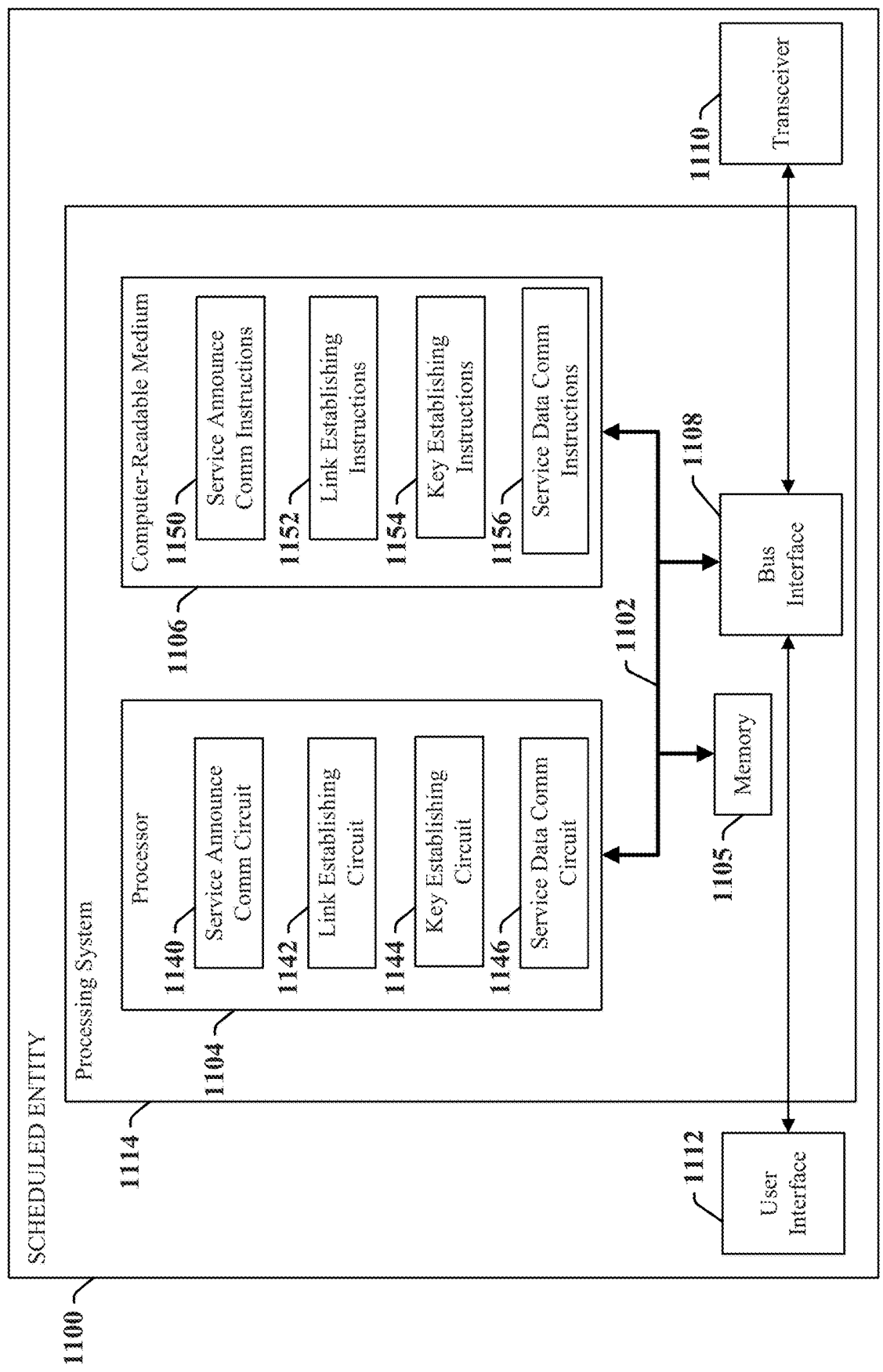
FIG. 11 is a conceptual diagram illustrating an example of a hardware implementation for an exemplary scheduled entity employing a processing system.

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of FIGS. 1 and/or 2.

The scheduled entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1100 may be configured to perform any one or more of the functions described herein. That is, the processor 1104, as utilized in a scheduled entity 1100, may be used to implement any one or more of the processes and procedures described below and illustrated in FIGS. 12 and 13.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects of the disclosure, the processor 1104 may include service announcement communicating circuitry 1140 configured for various functions, including, for example, sending/receiving service announcement messages. For example, the service announcement communicating circuitry 1140 may be configured to implement one or more of the functions described below in relation to FIG. 12, including, e.g., block 1202 and in relation to FIG. 13, including, e.g., block 1302. The processor 1104 may also include link establishing circuitry 1142 configured for various functions, including, for example, establishing a secure link between devices. For example, the link establishing circuitry 1142 may be configured to implement one or more of the functions described below in relation to FIG. 12, including, e.g., block 1204 and in relation to FIG. 13, including, e.g., block 1304. The processor 1104 may also include key establishing circuitry 1144 configured for various functions, including, for example, establishing a key between devices. For example, the key establishing circuitry 1144 may be configured to implement one or more of the functions described below in relation to FIG. 12, including, e.g., block 1204 and in relation to FIG. 13, including, e.g., block 1304. The processor 1104 may further include service data communication circuitry 1146 configured for various functions, including, for example, communicating service data between devices. For example, the service data communicating circuitry 1146 may be configured to implement one or more of the functions described below in relation to FIG. 12, including, e.g., blocks 1206 and 1208 and in relation to FIG. 13, including, e.g., blocks 1306 and 1308.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more example, the computer-readable storage medium 1106 may include service announcement communicating instructions 1150 configured for various functions, including, for example, sending/receiving service announcement messages. For example, the service announcement communicating instructions 1150 may be configured to implement one or more of the functions described below in relation to FIG. 12, including, e.g., block 1202 and in relation to FIG. 13, including, e.g., block 1302. The computer-readable storage medium 1106 may also include link establishing instructions 1152 configured for various functions, including, for example, establishing a secure link between devices. For example, the link establishing instructions 1152 may be configured to implement one or more of the functions described below in relation to FIG. 12, including, e.g., block 1204 and in relation to FIG. 13, including, e.g., block 1304. The computer-readable storage medium 1106 may also include key establishing instructions 1154 configured for various functions, including, for example, establishing a key between devices. For example, the key establishing instructions 1154 may be configured to implement one or more of the functions described below in relation to FIG. 12, including, e.g., block 1204 and in relation to FIG. 13, including, e.g., block 1304. The computer-readable storage medium 1106 may further include service data communication instructions 1156 configured for various functions, including, for example, communicating service data between devices. For example, the service data communicating instructions 1156 may be configured to implement one or more of the functions described below in relation to FIG. 12, including, e.g., blocks 1206 and 1208 and in relation to FIG. 13, including, e.g., blocks 1306 and 1308.

Figure 12:
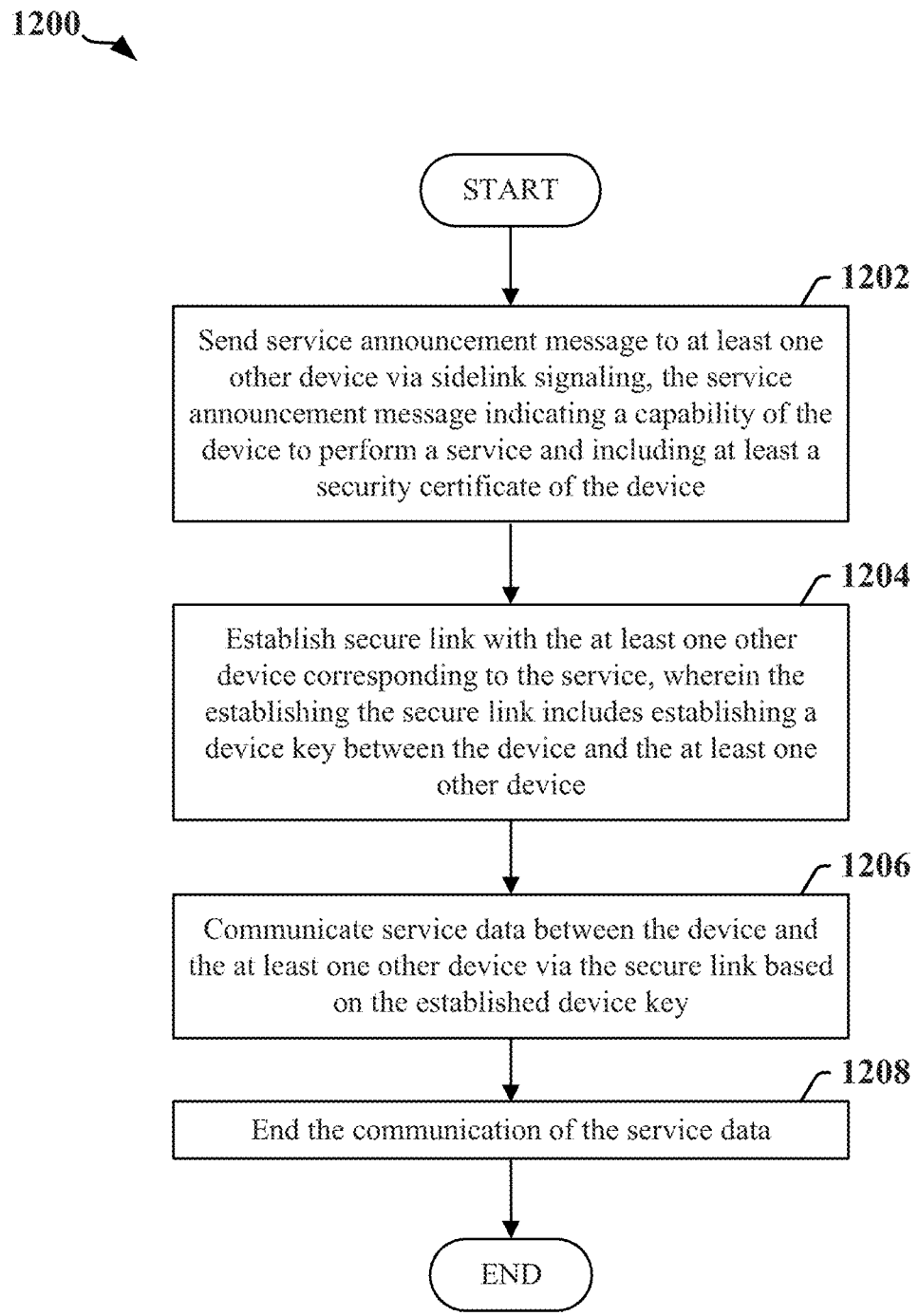
FIG. 12 is a flow chart illustrating an exemplary process for establishing a secure link for vehicle-to-vehicle (V2V) communication in accordance with some aspects of the present disclosure.

FIG. 12 is a flow chart illustrating an exemplary process 1200 for establishing a secure link for vehicle-to-vehicle (V2V) communication in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by a device (e.g., the scheduled entity 1100 illustrated in FIG. 11). In some examples, the process 1200 may be carried out by any suitable apparatus or means for carrying out the functions or algorithm described below.

At block 1202, the device sends a service announcement message to at least one other device via sidelink (e.g., PC5 layer) signaling. The service announcement message indicates a capability of the device to perform a service and includes at least a security certificate of the device.

At block 1204, the device establishes a secure link with the at least one other device corresponding to the service. The establishing the secure link includes establishing a device key (e.g., long-term key) between the device and the at least one other device.

At block 1206, the device communicates service data for the service between the device and the at least one other device via the secure link based on the established long-term key.

At block 1208, the device ends the communication of the service data based on a condition. For example, the device may end the communication of the service data based on at least one of the device failing to receive a direct communication keepalive message from the at least one other device, the device detecting that the least one other device is no longer in proximity, or the device receiving a request from the at least one other device to end the communication of the service data.

In an aspect, the establishing the secure link includes receiving a direct communication request message from the at least one other device, the direct communication request message including at least a security certificate of the at least one other device, sending a direct security mode command message to the at least one other device, receiving a direct security mode complete message from the at least one other device, and sending a direct communication accept message to the at least one other device.

In an aspect, the at least one other device is a second device and the establishing the long-term key includes generating the long-term key, encrypting the long-term key with a public key of the second device, and sending the encrypted long-term key to the second device subsequent to the receiving of the direct communication request message and prior to the sending of the direct security mode command message.

In another aspect, the at least one other device is a second device and the establishing the long-term key includes receiving the long-term key encrypted with a public key of the device from the second device subsequent to the receiving of the direct communication request message and prior to the sending of the direct security mode command message.

In a further aspect, the at least one other device is a second device and the establishing the long-term key includes generating a first portion (e.g., first half) of the long-term key, encrypting the first portion of the long-term key with a public key of the second device, sending the encrypted first portion of the long-term key to the second device subsequent to the receiving of the direct communication request message and prior to the sending of the direct security mode command message, and receiving a second portion (e.g., second half) of the long-term key encrypted with a public key of the device from the second device subsequent to the receiving of the direct communication request message and prior to the sending of the direct security mode command message.

In another aspect, the at least one other device is a second device and the establishing the long-term key includes generating the long-term key, encrypting the long-term key with a public key of the second device, and sending the encrypted long-term key to the second device via the direct security mode command message.

In a further aspect, the at least one other device is a second device and the establishing the long-term key includes receiving, from the second device via the direct communication request message, the long-term key encrypted with the security certificate of the device included in the service announcement message.

In an aspect, the at least one other device is a plurality of devices and the establishing the long-term key includes generating the long-term key, encrypting the long-term key with a public key of each of the plurality of devices to generate a plurality of information elements, and sending the plurality of information elements to the plurality of devices via the direct security mode command message.

In one configuration, the apparatus 1100 for wireless communication includes means for sending a service announcement message to at least one other device via sidelink (e.g., PC5 layer) signaling, the service announcement message indicating a capability of the device to perform a service and including at least a security certificate of the device, means for establishing a secure link with the at least one other device corresponding to the service, wherein the means for establishing the secure link includes means for establishing a device key (e.g., long-term key) between the device and the at least one other device, means for communicating service data between the device and the at least one other device via the secure link based on the established long-term key, and means for ending the communication of the service data.

In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1 and/or 2, and utilizing, for example, the processes and/or algorithms described herein in relation to FIG. 12.

Figure 13:
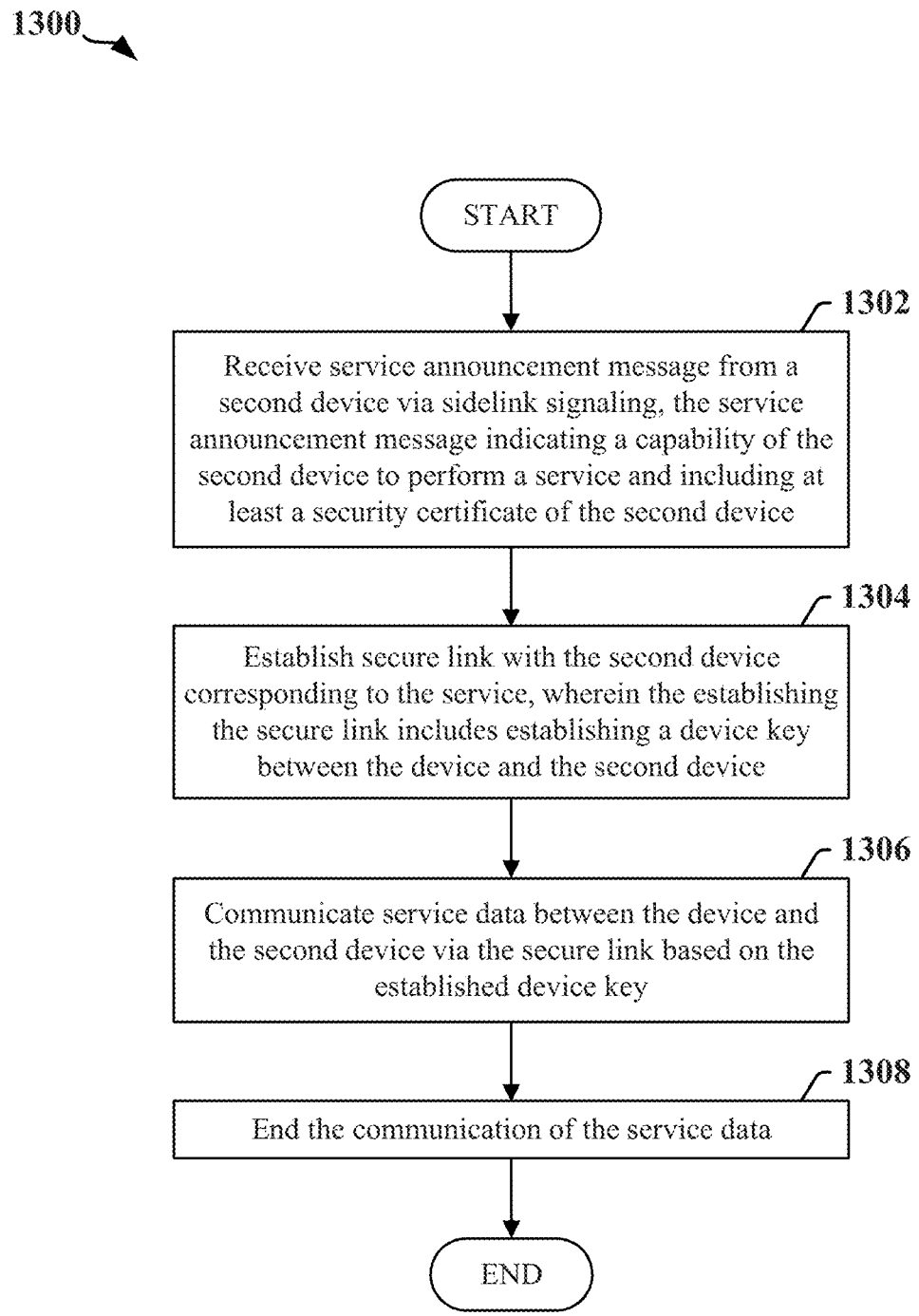
FIG. 13 is a flow chart illustrating another exemplary process for establishing a secure link for vehicle-to-vehicle (V2V) communication in accordance with some aspects of the present disclosure.

FIG. 13 is a flow chart illustrating an exemplary process 1300 for establishing a secure link for vehicle-to-vehicle (V2V) communication in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by a device (e.g., the scheduled entity 1100 illustrated in FIG. 11). In some examples, the process 1300 may be carried out by any suitable apparatus or means for carrying out the functions or algorithm described below.

At block 1302, the device receives a service announcement message from a second device via sidelink (e.g., PC5 layer) signaling. The service announcement message indicates a capability of the second device to perform a service and includes at least a security certificate of the second device.

At block 1304, the device establishes a secure link with the second device corresponding to the service. The establishing the secure link includes establishing a device key (e.g., long-term key) between the device and the second device.

At block 1306, the device communicates service data for the service between the device and the second device via the secure link based on the established long-term key.

At block 1308, the device ends the communication of the service data based on a condition. For example, the device may end the communication of the service data based on at least one of the device failing to send a direct communication keepalive message to the second device, the device no longer being in proximity to the second device, or the device sending a request to the second device to end the communication of the service data.

In an aspect, the establishing the secure link includes sending a direct communication request message to the second device, the direct communication request message including at least a security certificate of the device. receiving a direct security mode command message from the second device, sending a direct security mode complete message to the second device, and receiving a direct communication accept message from the second device.

In an aspect, the establishing the long-term key includes generating the long-term key, encrypting the long-term key with a public key of the second device, and sending the encrypted long-term key to the second device subsequent to the sending of the direct communication request message and prior to the receiving of the direct security mode command message.

In another aspect, the establishing the long-term key includes receiving the long-term key encrypted with a public key of the device from the second device subsequent to the sending of the direct communication request message and prior to the receiving of the direct security mode command message.

In a further aspect, the establishing the long-term key includes generating a first portion (e.g., first half) of the long-term key, encrypting the first portion of the long-term key with a public key of the second device, sending the encrypted first portion of the long-term key to the second device subsequent to the sending of the direct communication request message and prior to the receiving of the direct security mode command message, and receiving a second portion (e.g., second half) of the long-term key encrypted with a public key of the device from the second device subsequent to the sending of the direct communication request message and prior to the receiving of the direct security mode command message.

In another aspect, the establishing the long-term key includes generating the long-term key, encrypting the long-term key with a security certificate of the second device included in the service announcement message, and sending the encrypted long-term key to the second device via the direct communication request message.

In a further aspect, the establishing the long-term key includes receiving the long-term key encrypted with a public key of the device from the second device via the direct security mode command message.

In one configuration, the apparatus 1100 for wireless communication includes means for receiving a service announcement message from a second device via sidelink (e.g., PC5 layer) signaling, the service announcement message indicating a capability of the second device to perform a service and including at least a security certificate of the second device, means for establishing a secure link with the second device corresponding to the service, wherein the means for establishing the secure link including means for establishing a device key (e.g., long-term key) between the device and the second device, means for communicating service data between the device and the second device via the secure link based on the established long-term key, and means for ending the communication of the service data.

In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1 and/or 2, and utilizing, for example, the processes and/or algorithms described herein in relation to FIG. 13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method operable at a device for establishing a secure link for wireless communication, the method comprising:
   sending a service announcement message to at least one other device via sidelink signaling, the service announcement message indicating a capability of the device to perform a service and including at least a security certificate of the device;
   establishing a secure link with the at least one other device corresponding to the service, wherein the establishing the secure link includes:
      receiving a direct communication request message from the at least one other device, the direct communication request message including at least a security certificate of the at least one other device;
      sending a direct security mode command message to the at least one other device;
      receiving a direct security mode complete message from the at least one other device;
      sending a direct communication accept message to the at least one other device and
      establishing a device key between the device and the at least one other device; and
   communicating service data for the service between the device and the at least one other device via the secure link based on the established device key.

2. The method of claim 1, wherein the at least one other device is a second device and the establishing the device key comprises:
   generating the device key;
   encrypting the device key with a public key of the second device; and
   sending the encrypted device key to the second device subsequent to the receiving of the direct communication request message and prior to the sending of the direct security mode command message.

3. The method of claim 1, wherein the at least one other device is a second device and the establishing the device key comprises:
   receiving the device key encrypted with a public key of the device from the second device subsequent to the receiving of the direct communication request message and prior to the sending of the direct security mode command message.

4. The method of claim 1, wherein the at least one other device is a second device and the establishing the device key comprises:
   generating a first portion of the device key;
   encrypting the first portion of the device key with a public key of the second device;
   sending the encrypted first portion of the device key to the second device subsequent to the receiving of the direct communication request message and prior to the sending of the direct security mode command message; and
   receiving a second portion of the device key encrypted with a public key of the device from the second device subsequent to the receiving of the direct communication request message and prior to the sending of the direct security mode command message.

5. The method of claim 1, wherein the at least one other device is a second device and the establishing the device key comprises:
   generating the device key;
   encrypting the device key with a public key of the second device; and
   sending the encrypted device key to the second device via the direct security mode command message.

6. The method of claim 1, wherein the at least one other device is a second device and the establishing the device key comprises:
   receiving, from the second device via the direct communication request message, the device key encrypted with the security certificate of the device included in the service announcement message.

7. The method of claim 1, wherein the at least one other device is a plurality of devices and the establishing the device key comprises:
   generating the device key;
   encrypting the device key with a public key of each of the plurality of devices to generate a plurality of information elements; and
   sending the plurality of information elements to the plurality of devices via the direct security mode command message.

8. The method of claim 1, further comprising ending the communication of the service data based on at least one of:
   the device failing to receive a direct communication keepalive message from the at least one other device;
   the device detecting that the least one other device is no longer in proximity; or
   the device receiving a request from the at least one other device to end the communication of the service data.

9. The method of claim 1, wherein the wireless communications vehicle-to-everything (V2X) communication.

10. A device for establishing a secure link for wireless communication, comprising:
    means for sending a service announcement message to at least one other device via sidelink signaling, the service announcement message indicating a capability of the device to perform a service and including at least a security certificate of the device;
    means for establishing a secure link with the at least one other device corresponding to the service, wherein the means for establishing the secure link is configured to:
       receive a direct communication request message from the at least one other device, the direct communication request message including at least a security certificate of the at least one other device;
       send a direct security mode command message to the at least one other device;
       receive a direct security mode complete message from the at least one other device; and
       send a direct communication accept message to the at least one other device; and
       further includes means for establishing a device key between the device and the at least one other device; and
    means for communicating service data for the service between the device and the at least one other device via the secure link based on the established device key.

11. The device of claim 8, wherein the at least one other device is a second device and the means for establishing the device key is configured to:
    generate the device key;
    encrypt the device key with a public key of the second device; and send the encrypted device key to the second device subsequent to the receiving of the direct communication request message and prior to the sending of the direct security mode command message.

12. The device of claim 8, wherein the at least one other device is a second device and the means for establishing the device key is configured to:
receive the device key encrypted with a public key of the device from the second device subsequent to the receiving of the direct communication request message and prior to the sending of the direct security mode command message.

13. The device of claim 8, wherein the at least one other device is a second device and the means for establishing the device key is configured to:
generate a first portion of the device key;
encrypt the first portion of the device key with a public key of the second device;
send the encrypted first portion of the device key to the second device subsequent to the receiving of the direct communication request message and prior to the sending of the direct security mode command message; and
receive a second portion of the device key encrypted with a public key of the device from the second device subsequent to the receiving of the direct communication request message and prior to the sending of the direct security mode command message.

14. The device of claim 10, wherein the at least one other device is a second device and the means for establishing the device key is configured to:
generate the device key;
encrypt the device key with a public key of the second device; and
send the encrypted device key to the second device via the direct security mode command message.

15. The device of claim 10, wherein the at least one other device is a second device and the means for establishing the device key is configured to:
receive, from the second device via the direct communication request message, the device key encrypted with the security certificate of the device included in the service announcement message.

16. The device of the claim 10, wherein the wireless communication comprises vehicle-to-everything (V2X) communication.

17. A method operable at a device for establishing a secure link for wirelesscommunication, the method comprising:
receiving a service announcement message from a second device via sidelink signaling, the service announcement message indicating a capability of the second device to perform a service and including at least a security certificate of the second device;
establishing a secure link with the second device corresponding to the service, wherein the establishing the secure link comprises:
sending a direct communication request message to the second device, the direct communication request message including at least a security certificate of the device;
receiving a direct security mode command message from the second device;
sending a direct security mode complete message to the second device;
receiving a direct communication accept message from the second device establishing a device key between the device and the second device; and
communicating service data for the service between the device and the second device via the secure link based on the established device key.

18. The method of claim 17, wherein the establishing the device key comprises:
generating the device key;
encrypting the device key with a public key of the second device; and
sending the encrypted device key to the second device subsequent to the sending of the direct communication request message and prior to the receiving of the direct security mode command message.

19. The method of claim 17, wherein the establishing the device key comprises:
receiving the device key encrypted with a public key of the device from the second device subsequent to the sending of the direct communication request message and prior to the receiving of the direct security mode command message.

20. The method of claim 17, wherein the establishing the device key comprises:
generating a first portion of the device key;
encrypting the first portion of the device key with a public key of the second device;
sending the encrypted first portion of the device key to the second device subsequent to the sending of the direct communication request message and prior to the receiving of the direct security mode command message; and
receiving a second portion of the device key encrypted with a public key of the device from the second device subsequent to the sending of the direct communication request message and prior to the receiving of the direct security mode command message.

21. The method of claim 17, wherein the establishing the device key comprises:
generating the device key;
encrypting the device key with a security certificate of the second device included in the service announcement message; and
sending the encrypted device key to the second device via the direct communication request message.

22. The method of claim 17, wherein the establishing the device key comprises:
receiving the device key encrypted with a public key of the device from the second device via the direct security mode command message.

23. The method of claim 17, further comprising ending the communication of the service data based on at least one of:
the device failing to send a direct communication keepalive message to the second device;
the device no longer being in proximity to the second device; or the device sending a request to the second device to end the communication of the service data.

24. The method of claim 17, wherein the wireless communication comprises vehicle-to-everything (V2X) communication.

25. A device for establishing a secure link for wireless communication, comprising:
means for receiving a service announcement message from a second device via sidelink signaling, the service announcement message indicating a capability of the second device to perform a service and including at least a security certificate of the second device;

means for establishing a secure link with the second device corresponding to the service, wherein the means for establishing the secure link is configured to:
  send a direct communication request message to the second device, the direct communication request message including at least a security certificate of the device;
  receive a direct security mode command message from the second device;
  send a direct security mode complete message to the second device;
  receive a direct communication accept message from the second device; and
  wherein the means for establishing the secure link includes means for establishing a device key between the device and the second device; and
means for communicating service data for the service between the device and the second device via the secure link based on the established device key.

26. The device of claim 25, wherein the means for establishing the device key is configured to:
  generate the device key;
  encrypt the device key with a public key of the second device; and
  send the encrypted device key to the second device subsequent to the sending of the direct communication request message and prior to the receiving of the direct security mode command message.

27. The device of claim 25, wherein the means for establishing the device key is configured to:
  receive the device key encrypted with a public key of the device from the second device subsequent to the sending of the direct communication request message and prior to the receiving of the direct security mode command message; or
  receive the device key encrypted with the public key of the device from the second device via the direct security mode command message.

28. The device of claim 25, wherein means for establishing the device key is configured to:
  generate a first portion of the device key;
  encrypt the first portion of the device key with a public key of the second device;
  send the encrypted first portion of the device key to the second device subsequent to the sending of the direct communication request message and prior to the receiving of the direct security mode command message; and
  receive a second portion of the device key encrypted with a public key of the device from the second device subsequent to the sending of the direct communication request message and prior to the receiving of the direct security mode command message.

29. The device of claim 25, wherein the means for establishing the device key is configured to:
  generate the device key;
  encrypt the device key with a security certificate of the second device included in the service announcement message; and
  send the encrypted device key to the second device via the direct communication request message.

30. The device of claim 25, wherein the wireless communication comprises vehicle-to-everything (V2X) communication.

31. A device for establishing a secure link for wireless communication, the device comprising:
  memory;
  a transceiver; and
  a processor coupled to the memory and the transceiver and configured to:
    send a service announcement message stored in the memory to at least one other device via the transceiver using sidelink signaling, the service announcement message indicating a capability of the device to perform a service and including at least a security certificate of the device;
    establish a secure link with the at least one other device corresponding to the service, via the transceiver, at least in part, through:
      reception of a direct communication request message from the at least one other device, the direct communication request message including at least a security certificate of the at least one other device;
      transmission of a direct security mode command message to the at least one other device;
      reception of a direct security mode complete message from the at least one other device;
      transmission of a direct communication accept message to the at least one other device; and
      establishment of a device key between the device and the at least one other device; and
    communicate service data for the service between the device and the at least one other device via the secure link based on the established device key.

32. The device of claim 27, wherein the at least one other device comprises a second device and the processor is further configured to:
  generate the device key;
  encrypt the device key with a public key of the second device; and
  transmit the encrypted device key to the second device, via the transceiver, subsequent to reception of the direct communication request message and prior to the transmission of the direct security mode command message.

33. The device of claim 31, wherein the at least one other device comprises a second device and the processor is further configured to receive, via the transceiver, the device key encrypted with a public key of the device from the second device subsequent to the reception of the direct communication request message and prior to the transmission of the direct security mode command message.

34. The device of claim 31, wherein the at least one other device comprises a second device and the processor is further configured to:
  generate a first portion of the device key;
  encrypt the first portion of the device key with a public key of the second device;
  transmit, via the transceiver, the encrypted first portion of the device key to the second device subsequent to the reception of the direct communication request message and prior to the transmission of the direct security mode command message; and
  receive, via the transceiver, a second portion of the device key encrypted with a public key of the device from the second device subsequent to the reception of the direct communication request message and prior to the transmission of the direct security mode command message.

35. The device of claim 31, wherein the at least one other device comprises a second device and the processor is further configured to:
  generate the device key;
  encrypt the device key with a public key of the second device; and
  transmit, via the transceiver, the encrypted device key to the second device via the direct security mode command message.

36. The device of claim 31, wherein the at least one other device comprises a second device and the processor is further configured to receive, via the transceiver, from the second device in the direct communication request message, the device key encrypted with the security certificate of the device included in the service announcement message.

37. The device of claim 31, wherein the at least one other device comprises a plurality of devices and the processor is further configured to:
  generate the device key;
  encrypt the device key with a public key of each of the plurality of devices to generate a plurality of information elements; and
  transmit, via the transceiver, the plurality of information elements to the plurality of devices via the direct security mode command message.

38. The device of claim 31, and wherein the processor is further configured to end the communication of the service data based on at least one of:
  a failure to receive, via the transceiver, a direct communication keepalive message from the at least one other device;
  a determination that the least one other device is no longer in proximity; or reception of a request from the at least one other device to end the communication of the service data.

39. The device of claim 31, wherein the wireless communication comprises vehicle-to-everything (V2X) communication.

40. An article of manufacture comprising:
  a non-transitory computer-readable medium having stored therein instructions executable by one or more processors of a device for establishing a secure link for wireless communication to:
  initiate transmission of a service announcement message using sidelink signaling, the service announcement message indicating a capability of the device to perform a service and including at least a security certificate of the device;
  establish a secure link with the at least one other device corresponding to the service, at least in part, through:
    reception of a direct communication request message from the at least one other device, the direct communication request message including at least a security certificate of the at least one other device;
    transmission of a direct security mode command message to the at least one other device;
    reception of a direct security mode complete message from the at least one other device;
    transmission of a direct communication accept message to the at least one other device; and
    establishment of a device key between the device and the at least one other device; and
  communicate service data for the service between the device and the at least one other device via the secure link based on the established device key.

41. The article of claim 40, wherein the at least one other device comprises a second device and the instructions are further executable by the one or more processors to:
  generate the device key;
  encrypt the device key with a public key of the second device; and
  initiate transmission of the encrypted device key to the second device subsequent to reception of the direct communication request message and prior to the transmission of the direct security mode command message.

42. The article of claim 40, wherein the at least one other device comprises a second device and the instructions are further executable by the one or more processors to receive the device key encrypted with a public key of the device from the second device subsequent to the reception of the direct communication request message and prior to the transmission of the direct security mode command message.

43. The article of claim 40, wherein the at least one other device comprises a second device and the instructions are further executable by the one or more processors to:
  generate a first portion of the device key;
  encrypt the first portion of the device key with a public key of the second device;
  initiate transmission of the encrypted first portion of the device key to the second device subsequent to the reception of the direct communication request message and prior to the transmission of the direct security mode command message; and
  receive a second portion of the device key encrypted with a public key of the device from the second device subsequent to the reception of the direct communication request message and prior to the transmission of the direct security mode command message.

44. The article of claim 40 wherein the at least one other device comprises a second device and the instructions are further executable by the one or more processors to:
  generate the device key;
  encrypt the device key with a public key of the second device; and
  initiate transmission of the encrypted device key to the second device via the direct security mode command message.

45. The article of claim 40, wherein the at least one other device comprises a second device and the instructions are further executable by the one or more processors to receive, from the second device in the direct communication request message, the device key encrypted with the security certificate of the device included in the service announcement message.

46. The article of claim 40, wherein the at least one other device comprises a plurality of devices and the instructions are further executable by the one or more processors to:
  generate the device key;
  encrypt the device key with a public key of each of the plurality of devices to generate a plurality of information elements; and
  initiate transmission of the plurality of information elements to the plurality of devices via the direct security mode command message.

47. The article of claim 40, and wherein and the instructions are further executable by the one or more processors to end the communication of the service data based on at least one of:
  a failure to receive a direct communication keepalive message from the at least one other device;
  a determination that the least one other device is no longer in proximity; or reception of a request from the at least one other device to end the communication of the service data.

48. The device of claim 40, wherein the wireless communication comprises vehicle-to-everything (V2X) communication.

49. A device for establishing a secure link for wireless communication, the device comprising:
   memory;
   a transceiver; and
   a processor coupled to the memory and the transceiver and configured to:
      receive, via the transceiver, a service announcement message from a second device using sidelink signaling, the service announcement message indicating a capability of the second device to perform a service and including at least a security certificate of the second device;
      establish a secure link with the second device corresponding to the service, at least in part, through:
         transmission of a direct communication request message stored in the memory to the second device via the transceiver, the direct communication request message including at least a security certificate of the device;
         reception of a direct security mode command message from the second device via the transceiver;
         transmission of a direct security mode complete message to the second device via the transceiver;
         reception of a direct communication accept message from the second device via the transceiver; and
         establishment of a device key between the device and the second device; and
      communicate service data for the service between the device and the second device via the secure link based on the established device key.

50. The device of claim 49, and wherein the processor is further configured to:
   generate the device key;
   encrypt the device key with a public key of the second device; and
   transmit, via the transceiver, the encrypted device key to the second device subsequent to the transmission of the direct communication request message and prior to the reception of the direct security mode command message.

51. The device of claim 49, and wherein the processor is further configured to receive, via the transceiver, the device key encrypted with a public key of the device from the second device subsequent to the transmission of the direct communication request message and prior to the reception of the direct security mode command message.

52. The device of claim 49, and wherein the processor is further configured to:
   generate a first portion of the device key;
   encrypt the first portion of the device key with a public key of the second device;
   transmit, via the transceiver, the encrypted first portion of the device key to the second device subsequent to the transmission of the direct communication request message and prior to the reception of the direct security mode command message; and
   receive, via the transceiver, a second portion of the device key encrypted with a public key of the device from the second device subsequent to the transmission of the direct communication request message and prior to the reception of the direct security mode command message.

53. The device of claim 49, and wherein the processor is further configured to:
   generate the device key;
   encrypt the device key with a security certificate of the second device included in the service announcement message; and
   transmit, via the transceiver, the encrypted device key to the second device via the direct communication request message.

54. The device of claim 49, and wherein the processor is further configured to receive, via the transceiver, the device key encrypted with a public key of the device from the second device via the direct security mode command message.

55. The device of claim 49, and wherein the processor is further configured to end the communication of the service data based on at least one of:
   a determination to not send a direct communication keepalive message to the second device;
   a determination that the device is no longer in proximity to the second device; or
   transmission of a request to the second device to end the communication of the service data.

56. The device of claim 49, wherein the wireless communication comprises vehicle-to-everything (V2X) communication.

57. An article of manufacture comprising:
   a non-transitory computer-readable medium having stored therein instructions executable by one or more processors of a device for establishing a secure link for the communication to:
      receive a service announcement message from a second device using sidelink signaling, the service announcement message indicating a capability of the second device to perform a service and including at least a security certificate of the second device;
      establish a secure link with the second device corresponding to the service, at least in part, through:
         transmission of a direct communication request message stored in the memory to the second device via the transceiver, the direct communication request message including at least a security certificate of the device;
         reception of a direct security mode command message from the second device via the transceiver;
         transmission of a direct security mode complete message to the second device via the transceiver;
         reception of a direct communication accept message from the second device via the transceiver; and
         establishment of a device key between the device and the second device; and
      communicate service data for the service between the device and the second device via the secure link based on the established device key.

58. The article of claim 57, and wherein the instructions are further executable by one or more processors to:
   generate the device key;
   encrypt the device key with a public key of the second device; and
   initiate transmission of the encrypted device key to the second device subsequent to the transmission of the direct communication request message and prior to the reception of the direct security mode command message.

59. The article of claim 57, and wherein the instructions are further executable by one or more processors to receive the device key encrypted with a public key of the device from the second device subsequent to the transmission of the direct communication request message and prior to the reception of the direct security mode command message.

60. The article of claim 57, and wherein the instructions are further executable by one or more processors to:

generate a first portion of the device key;

encrypt the first portion of the device key with a public key of the second device;

initiate transmission of the encrypted first portion of the device key to the second device subsequent to the transmission of the direct communication request message and prior to the reception of the direct security mode command message; and receive a second portion of the device key encrypted with a public key of the device from the second device subsequent to the transmission of the direct communication request message and prior to the reception of the direct security mode command message.

61. The article of claim 57, and wherein the instructions are further executable by one or more processors to:

generate the device key;

encrypt the device key with a security certificate of the second device included in the service announcement message; and initiate transmission of the encrypted device key to the second device via the direct communication request message.

62. The article of claim 57, and wherein the instructions are further executable by one or more processors to receive the device key encrypted with a public key of the device from the second device via the direct security mode command message.

63. The article of claim 57, and wherein the instructions are further executable by one or more processors to end the communication of the service data based on at least one of:

a determination to not send a direct communication keepalive message to the second device;

a determination that the device is no longer in proximity to the second device; or a determination to transmit a request to the second device to end the communication of the service data.

64. The device of claim 57, wherein the wireless communication comprises vehicle-to-everything (V2X) communication.

* * * * *